US009519781B2

(12) United States Patent
Golshan et al.

(10) Patent No.: US 9,519,781 B2
(45) Date of Patent: Dec. 13, 2016

(54) SYSTEMS AND METHODS FOR VIRTUALIZATION AND EMULATION ASSISTED MALWARE DETECTION

(75) Inventors: Ali Golshan, Santa Clara, CA (US); James S. Binder, San Jose, CA (US)

(73) Assignee: Cyphort Inc., Santa Clara, CA (US)

( * ) Notice: Subject to any disclaimer, the term of this patent is extended or adjusted under 35 U.S.C. 154(b) by 0 days.

(21) Appl. No.: 13/288,905

(22) Filed: Nov. 3, 2011

(65) Prior Publication Data
US 2013/0117848 A1  May 9, 2013

(51) Int. Cl.
*G06F 21/56* (2013.01)
*H04L 29/06* (2006.01)
*G06F 21/53* (2013.01)
*G06F 21/55* (2013.01)
*G06F 9/455* (2006.01)

(52) U.S. Cl.
CPC ............ *G06F 21/566* (2013.01); *G06F 21/53* (2013.01); *G06F 21/552* (2013.01); *H04L 63/145* (2013.01); *H04L 63/1425* (2013.01); *G06F 9/45541* (2013.01); *H04L 2463/144* (2013.01)

(58) Field of Classification Search
CPC .......... G06F 21/50; G06F 21/52; G06F 21/53; G06F 21/55; G06F 21/56; G06F 21/566; G06F 9/455; G06F 9/45533; G06F 9/45541; H04L 63/14; H04L 63/1408; H04L 63/1425; H04L 63/1433; H04L 63/1441; H04L 63/145; H04L 2463/144
USPC ...... 726/24, 23, 22; 713/188; 718/1; 703/23, 703/26
See application file for complete search history.

(56) References Cited

U.S. PATENT DOCUMENTS

| 7,418,729 | B2 * | 8/2008 | Szor ................................. 726/22 |
| 7,540,030 | B1 * | 5/2009 | Zaitsev ........................... 726/24 |
| 7,664,626 | B1 * | 2/2010 | Ferrie ............................. 703/23 |

(Continued)

OTHER PUBLICATIONS

Kang, Min Gyung et al. "Emulating Emulation-Resistant Malware," In Proceedings of the Workshop on Virtual Machine Security (VMSec), Nov. 9, 2009.

(Continued)

*Primary Examiner* — Zachary A Davis
(74) *Attorney, Agent, or Firm* — Nixon Peabody LLP

(57) ABSTRACT

Systems and methods for virtualization and emulation assisted malware detection are described. In some embodiments, a method comprises intercepting an object; instantiating and processing the object in a virtualization environment; tracing operations of the object while processing within the virtualization environment; detecting suspicious behavior associated with the object; instantiating an emulation environment in response to the detected suspicious behavior; processing, recording responses to, and tracing operations of the object within the emulation environment; detecting a divergence between the traced operations of the object within the virtualization environment to the traced operations of the object within the emulation environment; re-instantiating the virtualization environment; providing the recorded response from the emulation environment to the object in the virtualization environment; monitoring the operations of the object within the re-instantiation of the virtualization environment; identifying untrusted actions from the monitored operations; and generating a report regarding the identified untrusted actions of the object.

21 Claims, 17 Drawing Sheets

(56) References Cited

U.S. PATENT DOCUMENTS

| | | | |
|---|---|---|---|
| 8,060,074 B2 * | 11/2011 | Danford et al. | 455/419 |
| 8,108,912 B2 * | 1/2012 | Ferris | G06F 21/606 709/201 |
| 8,151,352 B1 * | 4/2012 | Novitchi | 726/24 |
| 8,176,477 B2 * | 5/2012 | Wu | 717/138 |
| 8,204,984 B1 * | 6/2012 | Aziz et al. | 709/224 |
| 8,266,698 B1 | 9/2012 | Seshardi et al. | |
| 8,375,444 B2 | 2/2013 | Aziz et al. | |
| 8,375,450 B1 | 2/2013 | Oliver et al. | |
| 8,407,797 B1 * | 3/2013 | Novitchi | 726/24 |
| 8,516,589 B2 * | 8/2013 | Jeong et al. | 726/24 |
| 8,751,490 B1 | 6/2014 | Cooley | |
| 8,769,683 B1 | 7/2014 | Oliver | |
| 8,984,581 B2 * | 3/2015 | Luna et al. | 726/1 |
| 2005/0081053 A1 | 4/2005 | Aston et al. | |
| 2006/0010440 A1 | 1/2006 | Anderson et al. | |
| 2006/0161982 A1 * | 7/2006 | Chari | G06F 21/53 726/23 |
| 2007/0244987 A1 | 10/2007 | Pedersen et al. | |
| 2007/0250930 A1 | 10/2007 | Aziz et al. | |
| 2008/0086776 A1 | 4/2008 | Tuvell et al. | |
| 2009/0077544 A1 | 3/2009 | Wu | |
| 2010/0064299 A1 | 3/2010 | Kacin et al. | |
| 2010/0115621 A1 | 5/2010 | Staniford et al. | |
| 2010/0192223 A1 | 7/2010 | Ismael et al. | |
| 2011/0041179 A1 | 2/2011 | Stahlberg | |
| 2011/0054879 A1 * | 3/2011 | Bogsanyl et al. | 703/23 |
| 2011/0055123 A1 | 3/2011 | Kennedy | |
| 2011/0145926 A1 | 6/2011 | Dalcher et al. | |
| 2011/0167494 A1 | 7/2011 | Bowen et al. | |
| 2011/0225655 A1 * | 9/2011 | Niemel et al. | 726/24 |
| 2011/0271343 A1 | 11/2011 | Kim et al. | |
| 2011/0302656 A1 | 12/2011 | El-Moussa | |
| 2012/0110672 A1 | 5/2012 | Judge et al. | |
| 2013/0097706 A1 | 4/2013 | Titonis et al. | |
| 2013/0117849 A1 | 5/2013 | Golshan et al. | |
| 2013/0227691 A1 | 8/2013 | Aziz et al. | |
| 2013/0263260 A1 | 10/2013 | Mahaffey et al. | |
| 2013/0276114 A1 | 10/2013 | Friedrichs et al. | |
| 2013/0298244 A1 | 11/2013 | Kumar et al. | |
| 2013/0318568 A1 | 11/2013 | Mahaffey et al. | |
| 2014/0090061 A1 | 3/2014 | Avasarala et al. | |
| 2014/0096251 A1 | 4/2014 | Doctor et al. | |
| 2015/0007312 A1 | 1/2015 | Pidathala et al. | |
| 2015/0106927 A1 | 4/2015 | Ferragut et al. | |
| 2015/0128263 A1 | 5/2015 | Raugas et al. | |
| 2015/0135262 A1 | 5/2015 | Porat et al. | |
| 2015/0172300 A1 | 6/2015 | Cochenour | |
| 2015/0180883 A1 | 6/2015 | Aktas et al. | |
| 2015/0244730 A1 | 8/2015 | Vu et al. | |
| 2015/0244732 A1 | 8/2015 | Golshan et al. | |
| 2016/0065601 A1 | 3/2016 | Gong et al. | |
| 2016/0078229 A1 | 3/2016 | Gong et al. | |

OTHER PUBLICATIONS

Chen, Xu et al. "Towards an Understanding of Anti-Virtualization and Anti-Debugging Behavior in Modern Malware," In Proceedings of the 38th Annual IEEE International Conference on Dependable Systems and Networks (DSN), Jun. 24, 2008.

International Application No. PCT/US2012/063566, International Search Report and Written Opinion mailed Jan. 22, 2013.

International Application No. PCT/US2012/063569, International Search Report and Written Opinion mailed Jan. 18, 2013.

International Preliminary Report on Patentability in International Application No. PCT/US2012/063566, mailed May 15, 2014.

International Preliminary Report on Patentability in International Application No. PCT/US2012/063569, mailed May 15, 2014.

Office Action in U.S. Appl. No. 13/288,917, mailed Sep. 12, 2013.

Office Action in U.S. Appl. No. 13/288,917, mailed Dec. 3, 2014.

Office Action in U.S. Appl. No. 13/288,917, mailed Jun. 30, 2014.

Extended European Search Report in European Application No. 12844780.2, dated Jul. 22, 2015.

Office Action in U.S. Appl. No. 13/288,917, mailed Jul. 13, 2015.

Extended European Search Report in European Application No. 12845692.8, dated Oct. 8, 2015.

Bayer, Ulrich, "TTAnalyze: A Tool for Analyzing Malware", Master's Thesis, Technical University of Vienna, Dec. 12, 2005.

Cavallaro, Lorenzo et al., "Anti-Taint-Analysis: Practical Evasion Techniques Against Information Flow Based Malware Defense", Secure Systems Lab at Stony Brook University, Tech. Rep, pp. 1-18, Nov. 2007.

Ho, Alex et al., "Practical Taint-Based Protection Using Demand Emulation", EuroSys '06, Proceedings of the 1st ACM SIGOPS/EuroSys European Conference on Computer Systems 2006, vol. 40, Issue 4, pp. 29-41, Oct. 2006.

Zhang, Xiao-Song et al., "A Practical Taint-Based Malware Detection", ICACIA 2008, International Conference on Apperceiving Computing and Intelligence Analysis, pp. 73-77, Dec. 2008.

International Search Report and Written Opinion in International Application No. PCT/US2015/017389, mailed Dec. 11, 2015.

International Search Report and Written Opinion in International Application No. PCT/US2015/017394, mailed Jun. 10, 2015.

Office Action in U.S. Appl. No. 14/629,444, mailed Feb. 9, 2016.

Office Action in U.S. Appl. No. 14/629,435, mailed Apr. 1, 2016.

Office Action in U.S. Appl. No. 13/288,917, mailed Jun. 1, 2016.

Office Action in U.S. Appl. No. 14/629,444, mailed Jun. 9, 2016.

Extended European Search Report in European Application No. 16167215.9, dated Sep. 28, 2016.

International Preliminary Report on Patentability in International Application No. PCT/US2015/017389, mailed Sep. 9, 2016.

International Preliminary Report on Patentability in International Application No. PCT/US2015/017394, mailed Sep. 9, 2016.

\* cited by examiner

SYSTEMS AND METHODS FOR VIRTUALIZATION AND EMULATION ASSISTED MALWARE DETECTION

CROSS-REFERENCE

This application is related to and incorporates by reference U.S. nonprovisional application Ser. No. 13/288,917, filed Nov. 3, 2011, and titled "Systems and Methods for Virtualized Malware Detection."

BACKGROUND

1. Field of the Invention

The present invention(s) generally relate to malware detection. More particularly, the invention(s) relate to systems and methods for virtualization and emulation assisted malware detection.

2. Description of Related Art

Malware and advanced persistent attacks are growing in number as well as damage. In 2010, the rise of targeted attacks included armored variations of Conficker.D and Stuxnet (which was referred to as the most advanced piece of malware ever created). Targeted attacks on organizations such as Google Inc., Intel Corporation, Adobe Systems Inc., The Boeing Company and an estimated 60 others have been extensively covered in the press. The state of the art security defenses have proven ineffective.

Cyber-criminals conduct methodical reconnaissance of potential victims to identify traffic patterns and existing defenses. Very sophisticated attacks involve multiple "agents" that individually appear to be legitimate traffic, then remain persistent in the target's network. The arrival of other agents may also be undetected, but when all are in the target network, these agents can work together to compromise security and steal targeted information. Legacy security solutions use a structured process (e.g., signature and heuristics matching) or analyze agent behavior in an isolated context, without the ability to detect future coordinated activity. As a result, legacy security solutions are not able to detect sophisticated malware that is armored, component based, and/or includes different forms of delayed execution.

SUMMARY OF THE INVENTION

Systems and methods for virtualized malware detection are described. In some embodiments, a method comprises intercepting an object provided from a first digital device to a second digital device, determining one or more resources the object requires when the object is executed, instantiating a virtual environment with the one or more resources, processing the object within the virtual environment, tainting operations of the object within the virtual environment, monitoring the operations of the object while processing within the virtual environment, identifying an additional resource of the object while processing that is not provided in the virtual environment, re-instantiating the virtual environment with the additional resource as well as the one or more resources, monitoring the operations of the object while processing within the re-instantiated virtual environment, identifying untrusted actions from the monitored operations, and generating a report identifying the operations and the untrusted actions of the object.

The object may comprise an executable file, a batch file, or a data file.

The method may further comprise performing a heuristic process on the object and determining the one or more resources the object requires based on the result of the heuristic process. Determining the one or more resources the object requires may be based on metadata associated with the object. The one or more resources may include one or more applications.

Generating the report identifying the operations and the untrusted actions of the object may comprise generating a signature to be used to detect malware. In some embodiments, generating the report identifying the operations and the untrusted actions of the object may comprise identifying a vulnerability in an application based on the operations and the untrusted actions of the object.

Re-instantiating the virtual environment with the additional resource as well as the one or more resources may comprise instantiating a second instance of a virtual environment with at least one resource that is different than a resource available in the prior virtual environment. Further, the method may comprise comparing identified monitored operations of the prior virtual environment to operations monitored in the second instance of the virtual environment. Generating the report may comprise generating the report based, at least in part, on the comparison.

The method may further comprise increasing or decreasing a frequency of a clock signal within the virtual environment. In some embodiments, the method may comprise logging a state of the virtual environment while monitoring the operations of the object. Further, re-instantiating the virtual environment with the additional resource as well as the one or more resources may comprise halting the virtual environment and re-instantiating the virtual environment with the logged state.

An exemplary system may comprise a collection module, a virtualization module, a control module, and a report module. The collection module may be configured to receive an object provided from a first digital device to a second digital device. The virtualization module may be configured to instantiate a virtual environment with the one or more resources, to process the object within the virtual environment, to identify an additional resource of the object while processing that is not provided in the virtual environment, to re-instantiate the virtual environment with the additional resource as well as the one or more resources, and to taint operations of the object within the virtual environment. The control module may be configured to determine one or more resources the object requires when the object is processed, to monitor the operations of the object while processing within the virtual environment, to monitor the operations of the object while processing within the re-instantiated virtual environment, and to identify untrusted actions from the monitored operations. The report module may be configured to generate a report identifying the operations and the untrusted actions of the object.

An exemplary computer readable medium may comprise instructions. The instructions may be executable by a processor for performing a method. The method may comprise intercepting an object provided from a first digital device to a second digital device, determining one or more resources the object requires when the object is executed, instantiating a virtual environment with the one or more resources, processing the object within the virtual environment, tainting operations of the object within the virtual environment, monitoring the operations of the object while processing within the virtual environment, identifying an additional resource of the object while processing that is not provided in the virtual environment, re-instantiating the virtual environment with the additional resource as well as the one or more resources, monitoring the operations of the object while processing within the re-instantiated virtual environment, identifying untrusted actions from the monitored operations, and generating a report identifying the operations and the untrusted actions of the object.

Systems and methods for virtualization and emulation malware detection are described. In some embodiments, a method comprises intercepting an object provided from a first digital device to a second digital device, instantiating a virtualization environment with the one or more resources, processing the object within the virtualization environment, tracing operations of the object while processing within the virtualization environment, detecting suspicious behavior associated with the object in the virtualization environment, instantiating an emulation environment in response to the detected suspicious behavior, processing the object within the emulation environment, recording responses to the object within the emulation environment, tracing operations of the object while processing within the emulation environment, detecting a divergence between the traced operations of the object within the virtualization environment and the traced operations of the object within the emulation environment, re-instantiating the virtualization environment in response to the detected divergence, providing the recorded response from the emulation environment to the object in the re-instantiated virtualization environment, monitoring the operations of the object while processing within the re-instantiation of the virtualization environment, identifying untrusted actions from the monitored operations, and generating a report regarding the identified untrusted actions of the object.

In various embodiments, the suspicious behavior comprises the object loading data into memory within the virtualization environment but not utilizing the data, the object scanning locations in memory of the virtualization environment and then terminating operations, or the object abruptly halting operations.

Trace capturing may be performed in a kernel of a digital device hosting the emulation environment. The method may further comprise increasing or decreasing a frequency of a clock signal within the emulation environment.

Re-instantiating the virtualization environment in response to the detected divergence may comprise instantiating a modified image of the virtualization environment. Re-instantiating the virtualization environment in response to the detected divergence may comprise halting the virtualization environment and restarting the virtualization environment.

In some embodiments, the method may further comprise applying state information from the emulation environment to the re-instantiated virtualization environment. The virtualization environment may be re-instantiated at a point in time where divergence is detected between the virtualization environment and the emulation environment.

An exemplary system may comprise a collection module, a virtualization module, an emulation module, and a control module. The collection module may be configured to receive an object provided from a first digital device to a second digital device. The virtualization module may be configured to instantiate a virtualization environment with the one or more resources, to process the object within the virtualization environment, to trace operations of the object while processing within the virtualization environment, to detect suspicious behavior associated with the object in the virtualization environment, to monitor the operations of the object while processing within a re-instantiation of the virtualization environment, to identify untrusted actions from the monitored operations, and to generate a report regarding the identified untrusted actions of the object. The emulation module may be configured to instantiate an emulation environment in response to the detected suspicious behavior, to process the object within the emulation environment, to record responses to the object within the emulation environment and to trace operations of the object while processing within the emulation environment. The control module may be configured to detect a divergence between the traced operations of the object within the virtualization environment and the traced operations of the object within the emulation environment, to re-instantiate the virtualization environment in response to the detected divergence, and to provide the recorded response from the emulation environment to the object in the virtualization environment.

An exemplary computer readable medium may comprise instructions. The instructions may be executable by a processor for performing a method. The method may comprise intercepting an object provided from a first digital device to a second digital device, instantiating a virtualization environment with the one or more resources, processing the object within the virtualization environment, tracing operations of the object while processing within the virtualization environment, detecting suspicious behavior associated with the object in the virtualization environment, instantiating an emulation environment in response to the detected suspicious behavior, processing the object within the emulation environment, recording responses to the object within the emulation environment, tracing operations of the object while processing within the emulation environment, detecting a divergence between the traced operations of the object within the virtualization environment to the traced operations of the object within the emulation environment, re-instantiating the virtualization environment in response to the detected divergence, providing the recorded response from the emulation environment and the object in the virtualization environment, monitoring the operations of the object while processing within the re-instantiation of the virtualization environment, identifying untrusted actions from the monitored operations, and generating a report regarding the identified untrusted actions of the object.

DETAILED DESCRIPTION OF THE INVENTION

Some embodiments of systems and methods described herein describe appliance-based solutions to protect enterprises, governments, and cloud infrastructures against targeted sophisticated attacks with corporate espionage or possibly cyber warfare objectives. By watching patterns of abnormal traffic, various systems and methods described herein may predict interactions, identify vulnerabilities, and predictably deny particular protocols, data, or network paths to developing malware.

An exemplary system comprises a heuristics engine, an instrumented execution infrastructure, and an intelligent engine. The heuristics engine may identify payloads that require further static and dynamic analysis. The dynamic and instrumented execution infrastructure may combine both virtualization and emulation environments. The environments may be constantly updated dynamically to enable "suspect" traffic to execute to its fullest extent through divergence detection and distributed interaction correlation. The intelligent engine may exchange and cross-reference data between "on the fly" spawned virtual environments and emulated environments allowing, for example, the implementation of such resources as modified nested page tables. As a result, the virtualization environment may recreate all or part of the end-user environment as well as a fully optimized environment to extract the full execution and behavior of potential malware. A contextual environment may also be created to allow analysis of targeted malware built with armoring capabilities such as anti-virtualization, or anti-debugging technologies.

Figure 1:
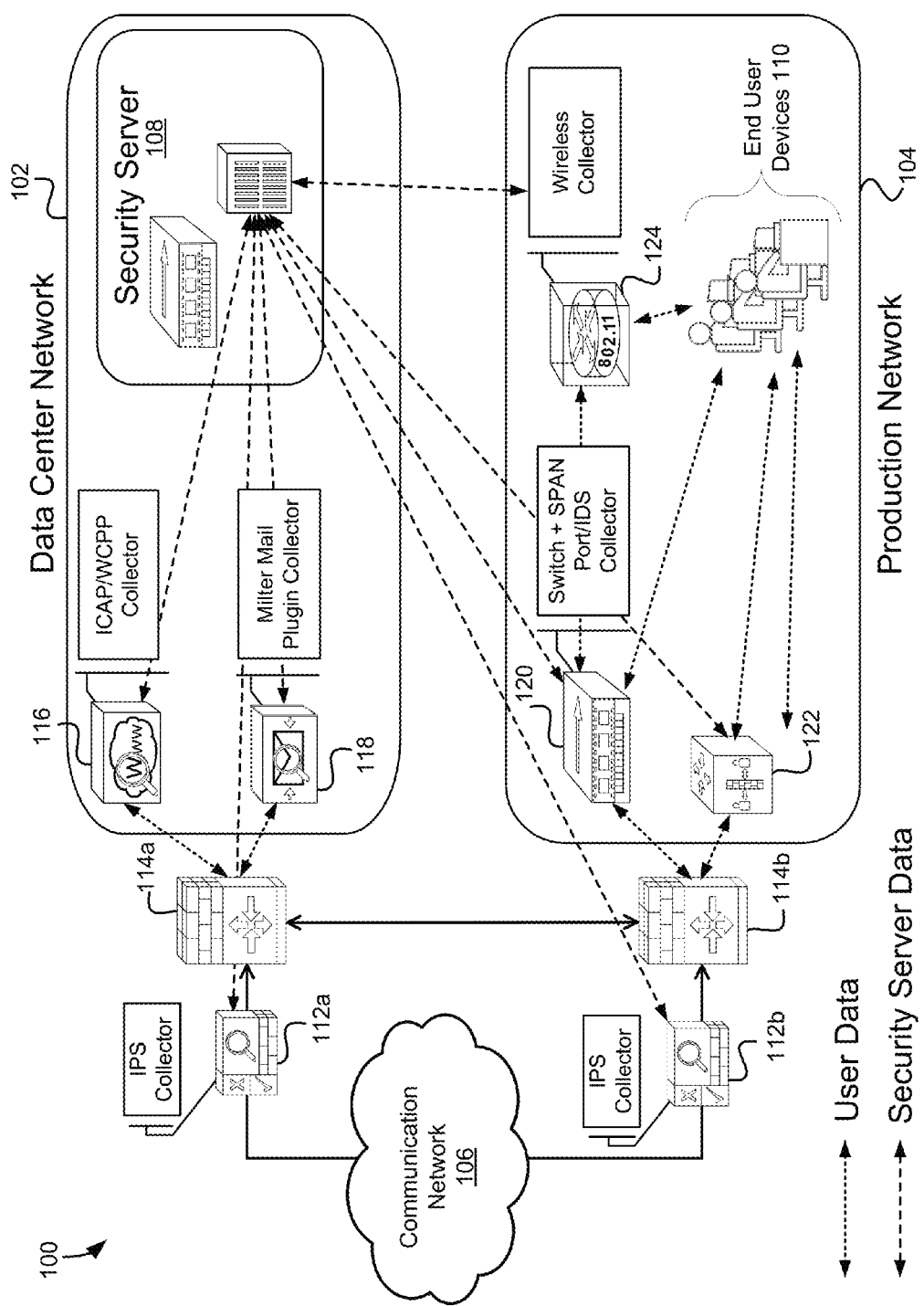
FIG. 1 is a diagram of an environment in which some embodiments may be practiced.
Figure 10:
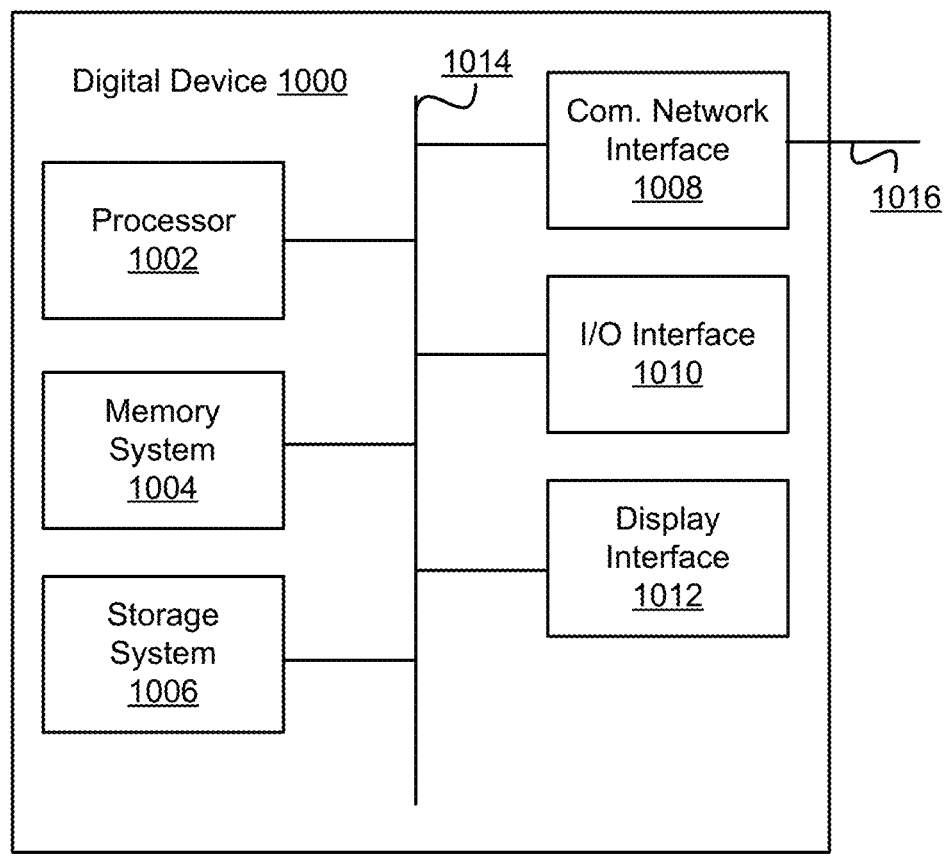
FIG. 10 is a block diagram of an exemplary digital device.

FIG. 1 is a diagram of an environment 100 in which some embodiments may be practiced. Systems and methods embodied in the environment 100 may detect malicious activity, identify malware, identify exploits, take preventive action, generate signatures, generate reports, determine malicious behavior, determine targeted information, recommend steps to prevent attack, and/or provide recommendations to improve security. The environment 100 comprises a data center network 102 and a production network 104 that communicate over a communication network 106. The data center network 102 comprises a security server 108. The production network 104 comprises a plurality of end user devices 110. The security server 108 and the end user devices 110 may comprise digital devices. A digital device is any device with a processor and memory. An embodiment of a digital device is depicted in FIG. 10.

The security server 108 is a digital device configured to identify malware and/or suspicious behavior by running virtualized and emulated environments and monitoring behavior of suspicious data within the virtualized and emulated environments. In various embodiments, the security server 108 receives suspicious data from one or more data collectors. The data collectors may be resident within or in communication with network devices such as Intrusion Prevention System (IPS) collectors 112a and 112b, firewalls 114a and 114b, Internet content adaptation protocol/web cache communication protocol (ICAP/WCCP) collectors 116, milter mail plug-in collectors 118, switch collectors 120, and/or access points 124. Those skilled in the art will appreciate that a collector and a network device may be two separate digital devices (e.g., see firewall collector and intrusion detection system collector).

In various embodiments, data collectors may be at one or more points within the communication network 106. A data collector, which may include a test access point (TAP) or switch port analyzer (SPAN) port (e.g., SPAN port/IDS at switch 120) for example, is configured to intercept network data from a network. The data collector may be configured to identify suspicious data. Suspicious data is any data collected by the data collector that has been flagged as suspicious by the data collector and/or any data that is to be processed within the virtualization environment.

The data collectors may filter the data before flagging the data as suspicious and/or providing the collected data to the security server 108. For example, the data collectors may filter out plain text but collect executables or batches. Further, in various embodiments, the data collectors may perform intelligent collecting. For example, data may be hashed and compared to a whitelist. The whitelist may identify data that is safe. In one example, the whitelist may identify digitally signed data or data received from a known trusted source as safe. Further, the whitelist may identify previously received information that has been determined to be safe. If data has been previously received, tested within the environments, and determined to be sufficiently trustworthy, the data collector may allow the data to continue through the network. Those skilled in the art will appreciate that the data collectors (or agents associated with the data collectors) may be updated by the security server 108 to help the data collectors recognize sufficiently trustworthy data and to take corrective action (e.g., quarantine and alert an administrator) if untrustworthy data is recognized. In some embodiments, if data is not identified as safe, the data collectors may flag the data as suspicious for further assessment.

Those skilled in the art will appreciate that one or more agents or other modules may monitor network traffic for common behaviors and may configure a data collector to collect data when data is directed in a manner that falls outside normal parameters. For example, the agent may determine or be configured to appreciate that a computer has been deactivated, a particular computer does not typically receive any data, or data received by a particular computer typically comes from a limited number of sources. If data is directed to a digital device in a manner that is not typical, the data collector may flag such data as suspicious and provide the suspicious data to the security server 108.

Network devices include any device configured to receive and provide data over a network. Examples of network devices include, but are not limited to, routers, bridges, security appliances, firewalls, web servers, mail servers, wireless access points (e.g., hotspots), and switches. In some embodiments, network devices include IPS collectors 112a and 112b, firewalls 114a and 114b, ICAP/WCCP servers 116, devices including milter mail plug-ins 118, switches 120, and/or access points 124.

The IPS collectors 112a and 112b may include any anti-malware device including IPS systems, intrusion detection and prevention systems (IDPS), or any other kind of network security appliances.

The firewalls 114a and 114b may include software and/or hardware firewalls. In some embodiments, the firewalls 114a and 114b may be embodied within routers, access points, servers (e.g., web servers), or appliances.

ICAP/WCCP servers 116 include any web server or web proxy server configured to allow access to a network and/or the Internet. Network devices including milter mail plug-ins 118 may include any mail server or device that provides mail and/or filtering functions and may include digital devices that implement milter, mail transfer agents (MTAs), sendmail, and postfix, for example.

Switches 120 include any switch or router. In some examples, the data collector may be implemented as a TAP, SPAN port, and/or intrusion detection system (IDS). Access points 124 include any device configured to provide wireless connectivity with one or more other digital devices.

The production network 104 is any network that allows one or more end user devices 110 to communicate over the communication network 106. The communication network 106 is any network that may carry data (encoded, compressed, and/or otherwise) from one digital device to another. In some examples, the communication network 106 may comprise a LAN and/or WAN. Further, the communication network 106 may comprise any number of networks. In some embodiments, the communication network 106 is the Internet.

FIG. 1 is exemplary and does not limit systems and methods described herein to the use of only those technologies depicted. For example, data collectors may be implemented in any web or web proxy server and is not limited to only the servers that implement ICAP and/or WCCP. Similarly, collectors may be implemented in any mail server and is not limited to mail servers that implement milter. Data collectors may be implemented at any point in one or more networks.

Those skilled in the art will appreciate that although FIG. 1 depicts a limited number of digital devices, collectors, routers, access points, and firewalls, there may be any kind and number of devices. For example, there may be any number of security servers 108, end user devices 110, IPS collectors 112a and 112b, firewalls 114a and 114b, ICAP/WCCP collectors 116, milter mail plug-ins 118, switches 120, and/or access points 124. Further, there may be any number of data center networks 102 and/or production networks 104.

Figure 2:
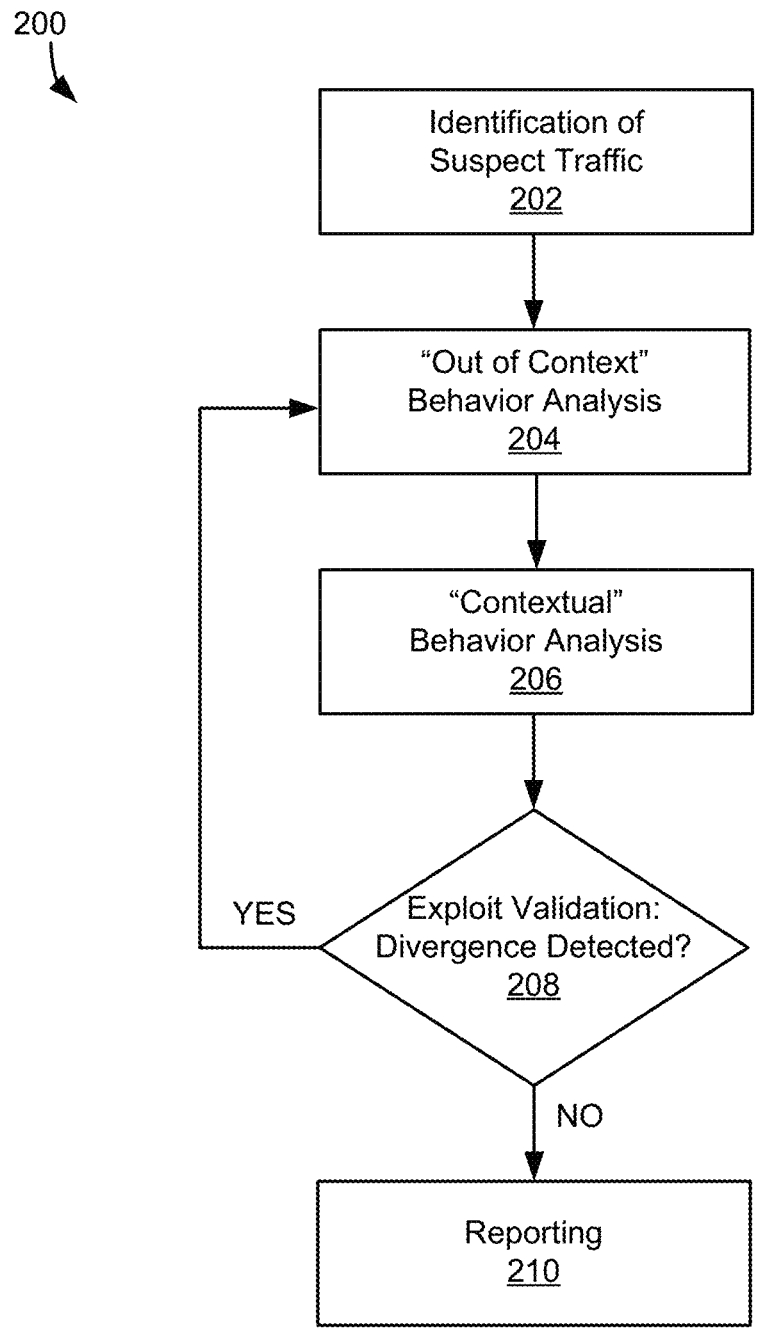
FIG. 2 is a flow diagram of an exemplary process for detection of malware and subsequent reporting in some embodiments.

FIG. 2 is a flow diagram of an exemplary process 200 for detection of malware and subsequent reporting in some embodiments. In step 202, suspect traffic is identified. In various embodiments, any network device may be used to monitor and/or collect network traffic for further assessment. In various embodiments, the network device and/or another digital device (e.g., the security server 108) applies heuristics and/or rules (e.g., comparison of data to a whitelist and/or a blacklist) to identify suspicious data. Those skilled in the art will appreciate that any technique may be used to flag network traffic as suspicious. For example, the security server 108 may flag data as suspicious if the data is directed towards a known infected computer, a disabled account, or any untrustworthy destination. Further, for example, the security server 108 may flag data as suspicious if the data came from a suspected source of malware or a source that is known to be untrustworthy (e.g., a previously identified botnet server). In another example, the data collector and/or agent associated with the data collector may perform packet analysis to identify suspicious characteristics in the collected data including the header, footer, destination IP, origin IP, payload and the like.

In step 204, suspect data and/or suspect processes are tested in one or more virtualization environments for "out of context" behavior analysis of the suspicious data and suspect processes. In some embodiments, the suspect data and/or processes are initially virtualized in a set of virtualization environments. Each different virtualization environment may be provisioned differently (e.g., each different virtualization environment may comprise different resources). The initial set of resources for a virtualization environment may be predetermined based on common resources required for processing the data and/or metadata associated with the data. If the suspect data and/or suspect process are determined to be behaving suspiciously in the virtualization environment, the suspect data and/or process may also be processed in an emulation environment as discussed here.

In various embodiments, the suspect data and/or process is analyzed with multiple virtualization environments to extend predictive analysis to distributed and application interactions as described further herein. The suspect data and/or process may be identified as malware or may behave in an untrusted manner in the virtualized environment. In order to further assess the data and/or process, the data and/or process may be processed in a plurality of different virtualization environments with different resources and different limitations. Those skilled in the art will appreciate that the suspicious data and/or process may or may not be further tested after the initial set of environments.

In step 206, contextual behavioral analysis is conducted on the suspect data and suspect processes using one or more emulation environments. In some embodiments, if the suspicious data acts suspiciously in one or more virtualization environments (e.g., halting execution without performing functions, storing data without using the data, and the like), the data is processed in one or more emulation environments. The emulation environment may be provisioned based on commonly needed resources, metadata associated with the suspicious data, and/or resources identified as needed during processing of the suspicious data within the virtualization environment. The suspicious data may have direct access to memory data in the emulation environment. The behavior of the suspicious data may be monitored within the emulation environment.

In step 208, exploits are identified and validated based on the behavior of the suspect data or suspect process in the environments. For example, the virtualization and/or emulation environments may be provisioned with various applications and operating systems in order to monitor the behavior of the suspect data or suspect process. As a result, the environments may test suspect data or suspect processes against network resources and/or applications to determine vulnerabilities and malicious actions. As a result, the assessment of the suspect data and/or process may extend predictive analysis to applications for a fuller or complete identification of targeted vulnerabilities.

In some embodiments, when a divergence is detected between the behavior of suspect data and/or process in the virtualization environment and the emulation environment, the virtualization environment may be dynamically re-instantiated and re-provisioned (e.g., the process returns to step 204 with the re-instantiated and/or re-provisioned virtualization environment(s)). Data from the emulation environment (e.g., responses from within the emulation environment) may be injected into the re-provisioned virtualization environment at or close to the time of divergence to enable further execution of the suspect data and assessment of related data.

In step 210, a report is generated that may identify threats and vulnerabilities based on the monitored behaviors of the suspect data and the suspect processes within the testing environments. In various embodiments, the report may include a description of exploits, vulnerabilities of applications or operating systems, behaviors of the suspect data, payloads associated with the suspect data, command and control protocols, and probable targets of the suspect data (e.g., what valuable information the suspicious data was attempting to steal). Further, the report may include heuristics, additions to whitelists, additions to blacklists, statistics, or signatures designed to detect the suspect data.

In various embodiments, the exemplary process 200 may be used to detect distributed attacks characteristic of advanced persistent threats. One exemplary scenario of a distributed attack is that an attacker may send a package to be stored in a specific location in the target computer. The package and the act of storing the package may be benign. The attacker may, over time, subsequently send an attack program. Without the previously stored package, the attack program may also appear benign and may not be detectable as malware by preexisting security solutions. Once the attack program retrieves the previously stored package, however, the attack program may attack the target system (e.g., exploit a vulnerability in the operating system to take over the target computer or copy valuable data).

In various embodiments, the security server 108 may first receive and test a package in at least one of the different environments. A report or other characteristic of the storage (e.g., the location of the stored data and the stored data) may be logged and stored for later testing within the environments. For example, an object that stores a package in memory but does not refer to the package after storage may be deemed to be suspicious. As such, the object may be tested in a variety of different environments and/or the package may be stored (e.g., in a protected long term storage memory such as a hard drive). When the security server 108 subsequently receives the attack program and, during testing, notes that the attack program is suspiciously checking a particular location in memory for data, the security server 108 may recognize that the previously stored package was stored in that particular location of memory. The security server 108 may retrieve the previously received package and store the package within the location in memory in one of the environments and retest the attack program. If the attack program acts maliciously after receiving the package, the security server 108 may generate a report (e.g., information, signature file, heuristic, and/or the like) to identify the package as well as the attack program in order to protect against similar attacks. Moreover, the security server 108 may generate a report identifying the exploited vulnerability so that the vulnerability may be corrected (e.g., the operating system patched or upgraded to correct the exploit). The security server 108 may also generate a report identifying the targeted information (e.g., a password file or file of credit card numbers) so that corrective action may be taken (e.g., move the file or encrypt the information).

Figure 3:
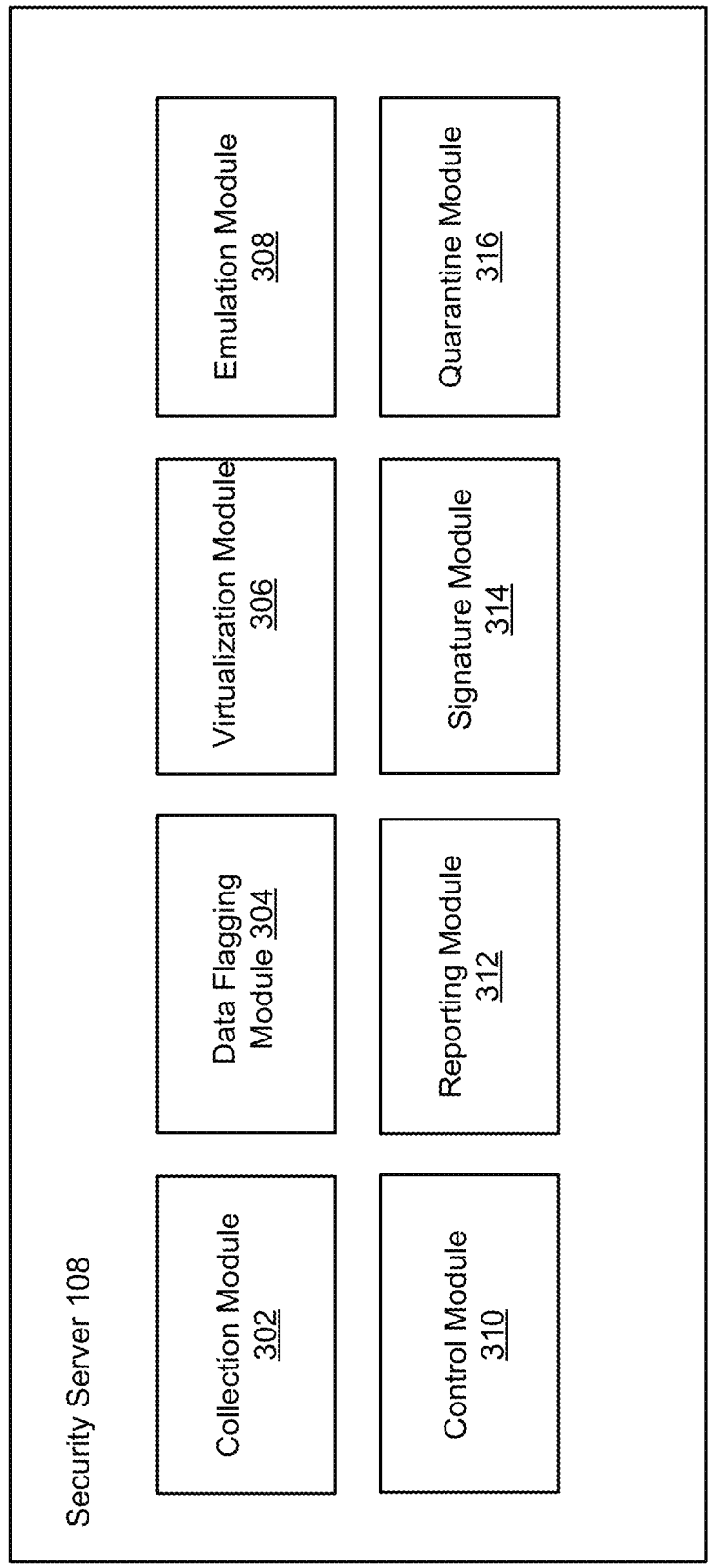
FIG. 3 is a block diagram of an exemplary security server in some embodiments.

FIG. 3 is a block diagram of an exemplary security server 108 in some embodiments. In various embodiments, the security server 108 leverages both virtualization and emulation systems and methods to detect malware anti-virtualization protections and accelerate "on-demand" virtualized environments for faster prediction. The security server 108 comprises a collection module 302, a data flagging module 304, a virtualization module 306, an emulation module 308, a control module 310, a reporting module 312, a signature module 314, and a quarantine module 316.

The collection module 302 is configured to receive network data (e.g., potentially suspicious data) from one or more sources. Network data is data that is provided on a network from one digital device to another. The collection module 302 may flag the network data as suspicious data based on, for example, whitelists, blacklists, heuristic analysis, statistical analysis, rules, and/or atypical behavior. In some embodiments, the sources comprise data collectors configured to receive network data. For example, firewalls, IPS, servers, routers, switches, access points and the like may, either individually or collectively, function as or include a data collector. The data collector may forward network data to the collection module 302.

In some embodiments, the data collectors filter the data before providing the data to the collection module 302. For example, the data collector may be configured to collect or intercept data that includes executables and batch files. In some embodiments, the data collector may be configured to follow configured rules. For example, if data is directed between two known and trustworthy sources (e.g., the data is communicated between two device on a whitelist), the data collector may not collect the data. In various embodiments, a rule may be configured to intercept a class of data (e.g., all documents created with MICROSOFT® Word software that may include macros or data that may comprise a script). In some embodiments, rules may be configured to target a class of attack or payload based on the type of malware attacks on the target network in the past. In some embodiments, the security server 108 may make recommendations (e.g., via the reporting module 312) and/or configure rules for the collection module 302 and/or the data collectors. Those skilled in the art will appreciate that the data collectors may comprise any number of rules regarding when data is collected or what data is collected.

In some embodiments, the data collectors located at various positions in the network may not perform any assessment or determination regarding whether the collected data is suspicious or trustworthy. For example, the data collector may collect all or a portion of the network data and provide the collected network data to the collection module 302 which may perform filtering.

The data flagging module 304 may perform one or more assessments to the collected data received by the collection module 302 and/or the data collector to determine if the intercepted network data is suspicious. The data flagging module 304 may apply rules as discussed herein to determine if the collected data should be flagged as suspicious. In various embodiments, the data flagging module 304 may hash the data and/or compare the data to a whitelist to identify the data as acceptable. If the data is not associated with the whitelist, the data flagging module 304 may flag the data as suspicious.

In various embodiments, collected network data may be initially identified as suspicious until determined otherwise (e.g., associated with a whitelist) or heuristics find no reason that the network data should be flagged as suspicious. In some embodiments, the data flagging module 304 may perform packet analysis to look for suspicious characteristics in the header, footer, destination IP, origin IP, payload, and the like. Those skilled in the art will appreciate that the data flagging module 304 may perform a heuristic analysis, a statistical analysis, and/or signature identification (e.g., signature-based detection involves searching for known patterns of suspicious data within the collected data's code) to determine if the collected network data is suspicious.

The data flagging module 304 may be resident at the data collector, at the security server 108, partially at the data collector, partially at the security server 108, or on a network device. For example, a router may comprise a data collector and a data flagging module 304 configured to perform one or more heuristic assessments on the collected network data. If the collected network data is determined to be suspicious, the router may direct the collected data to the security server 108.

In various embodiments, the data flagging module 304 may be updated. In one example, the security server 108 may provide new entries for a whitelist, entries for a blacklist, heuristic algorithms, statistical algorithms, updated rules, and/or new signatures to assist the data flagging module 304 to determine if network data is suspicious. The whitelists, entries for whitelists, blacklists, entries for blacklists, heuristic algorithms, statistical algorithms, and/or new signatures may be generated by one or more security servers 108 (e.g., via the reporting module 312).

The virtualization module 306 and emulation module 308 may analyze suspicious data for untrusted behavior (e.g., malware or distributed attacks). The virtualization module 306 is configured to instantiate one or more virtualized environments to process and monitor suspicious data. Within the virtualization environment, the suspicious data may operate as if within a target digital device. The virtualization module 306 may monitor the operations of the suspicious data within the virtualization environment to determine that the suspicious data is probably trustworthy, malware, or requiring further action (e.g., further monitoring in one or more other virtualization environments and/or monitoring within one or more emulation environments). In various embodiments, the virtualization module 306 monitors modifications to a system, checks outbound calls, and checks tainted data interactions.

In some embodiments, the virtualization module 306 may determine that suspicious data is malware but continue to process the suspicious data to generate a full picture of the malware, identify the vector of attack, determine the type, extent, and scope of the malware's payload, determine the target of the attack, and detect if the malware is to work with any other malware. In this way, the security server 108 may extend predictive analysis to actual applications for complete validation. A report may be generated (e.g., by the reporting module 312) describing the malware, identify vulnerabilities, generate or update signatures for the malware, generate or update heuristics or statistics for malware detection, and/or generate a report identifying the targeted information (e.g., credit card numbers, passwords, or personal information).

In some embodiments, the virtualization module 306 may flag suspicious data as requiring further emulation and analytics in the back end if the data has suspicious behavior such as, but not limited to, preparing an executable that is not executed, performing functions without result, processing that suddenly terminates, loading data into memory that is not accessed or otherwise executed, scanning ports, or checking in specific potions of memory when those locations in memory may be empty. The virtualization module 306 may monitor the operations performed by or for the suspicious data and perform a variety of checks to determine if the suspicious data is behaving in a suspicious manner.

The emulation module 308 is configured to process suspicious data in an emulated environment. Those skilled in the art will appreciate that malware may require resources that are not available or may detect a virtualized environment. When malware requires unavailable resources, the malware may "go benign" or act in a non-harmful manner. In another example, malware may detect a virtualized environment by scanning for specific files and/or memory necessary for hypervisor, kernel, or other virtualization data to execute. If malware scans portions of its environment and determines that a virtualization environment may be running, the malware may "go benign" and either terminate or perform nonthreatening functions.

In some embodiments, the emulation module 308 processes data flagged as behaving suspiciously by the virtualization environment. The emulation module 308 may process the suspicious data in a bare metal environment where the suspicious data may have direct memory access. The behavior of the suspicious data as well as the behavior of the emulation environment may be monitored and/or logged to track the suspicious data's operations. For example, the emulation module 308 may track what resources (e.g., applications and/or operating system files) are called in processing the suspicious data.

In various embodiments, the emulation module 308 records responses to the suspicious data in the emulation environment. If a divergence in the operations of the suspicious data between the virtualization environment and the emulation environment is detected, the virtualization environment may be configured to inject the response from the emulation environment. The suspicious data may receive the expected response within the virtualization environment and continue to operate as if the suspicious data was within the targeted digital device. This process is further described herein.

The control module 310 synchronizes the virtualization module 306 and the emulation module 308. In some embodiments, the control module 310 synchronizes the virtualization and emulation environments. For example, the control module 310 may direct the virtualization module 306 to instantiate a plurality of different virtualization environments with different resources. The control module 310 may compare the operations of different virtualization environments to each other in order to track points of divergence. For example, the control module 310 may identify suspicious data as operating in one manner when the virtualization environment includes INTERNET EXPLORER® browser v. 7.0 or v. 8.0, but operating in a different manner when interacting with INTERNET EXPLORER® browser v. 6.0 (e.g., when the suspicious data exploits a vulnerability that may be present in one version of an application but not present in another version).

The control module 310 may track operations in one or more virtualization environments and one or more emulation environments. For example, the control module 310 may identify when the suspicious data behaves differently in a virtualization environment in comparison with an emulation environment. Divergence and correlation analysis is when operations performed by or for suspicious data in a virtual environment is compared to operations performed by or for suspicious data in a different virtual environment or emulation environment. For example, the control module 310 may compare monitored steps of suspicious data in a virtual environment to monitored steps of the same suspicious data in an emulation environment. The functions or steps of or for the suspicious data may be similar but suddenly diverge. In one example, the suspicious data may have not detected evidence of a virtual environment in the emulation environment and, unlike the virtualized environment where the suspicious data went benign, the suspicious data undertakes actions characteristic of malware (e.g., hijacks a formerly trusted data or process).

When divergence is detected, the control module 310 may re-provision or instantiate a virtualization environment with information from the emulation environment (e.g., a page table including state information and/or response information further described herein) that may not be previously present in the original instantiation of the virtualization environment. The suspicious data may then be monitored in the new virtualization environment to further detect suspicious behavior or untrusted behavior. Those skilled in the art will appreciate that suspicious behavior of an object is behavior that may be untrusted or malicious. Untrusted behavior is behavior that indicates a significant threat.

In some embodiments, the control module 310 is configured to compare the operations of each virtualized environment in order to identify suspicious or untrusted behavior. For example, if the suspicious data takes different operations depending on the version of a browser or other specific resource when compared to other virtualized environments, the control module 310 may identify the suspicious data as malware. Once the control module 310 identifies the suspicious data as malware or otherwise untrusted, the control module 310 may continue to monitor the virtualized environment to determine the vector of attack of the malware, the payload of the malware, and the target (e.g., control of the digital device, password access, credit card information access, and/or ability to install a bot, keylogger, and/or rootkit). For example, the operations performed by and/or for the suspicious data may be monitored in order to further identify the malware, determine untrusted acts, and log the effect or probable effect.

The reporting module 312 is configured to generate reports based on the processing of the suspicious data of the virtualization module 306 and/or the emulation module 308. In various embodiments, the reporting module 312 generates a report to identify malware, one or more vectors of attack, one or more payloads, target of valuable data, vulnerabilities, command and control protocols, and/or behaviors that are characteristics of the malware. The reporting module 312 may also make recommendations to safeguard information based on the attack (e.g., move credit card information to a different digital device, require additional security such as VPN access only, or the like).

In some embodiments, the reporting module 312 generates malware information that may be used to identify malware or suspicious behavior. For example, the reporting module 312 may generate malware information based on the monitored information of the virtualization environment. The malware information may include a hash of the suspicious data or a characteristic of the operations of or for the suspicious data. In one example, the malware information may identify a class of suspicious behavior as being one or more steps being performed by or for suspicious data at specific times. As a result, suspicious data and/or malware may be identified based on the malware information without virtualizing or emulating an entire attack.

The optional signature module 314 is configured to store signature files that may be used to identify malware. The signature files may be generated by the reporting module 312 and/or the signature module 314. In various embodiments, the security server 108 may generate signatures, malware information, whitelist entries, and/or blacklist entries to share with other security servers. As a result, the signature module 314 may include signatures generated by other security servers or other digital devices. Those skilled in the art will appreciate that the signature module 314 may include signatures generated from a variety of different sources including, but not limited to, other security firms, antivirus companies, and/or other third-parties.

In various embodiments, the signature module 314 may provide signatures which are used to determine if network data is suspicious or is malware. For example, if network data matches the signature of known malware, then the network data may be classified as malware. If network data matches a signature that is suspicious, then the network data may be flagged as suspicious data. The malware and/or the suspicious data may be processed within a virtualization environment and/or the emulation environment as discussed herein.

The quarantine module 316 is configured to quarantine suspicious data and/or network data. In various embodiments, when the security serer 108 identifies malware or probable malware, the quarantine module 316 may quarantine the suspicious data, network data, and/or any data associated with the suspicious data and/or network data. For example, the quarantine module 316 may quarantine all data from a particular digital device that has been identified as being infected or possibly infected.

In some embodiments, the quarantine module 316 is configured to alert a security administrator or the like (e.g., via email, call, voicemail, or SMS text message) when malware or possible malware has been found.

In various embodiments, the security server 108 allows an administrator or other personnel to log into the security server 108. In one example, the security server 108 provides a graphical user interface or other user interface that authenticates a user (e.g., via digital signature, password, username, and the like). After the user is authenticated, the security server 108 may allow the user to view the processing of the virtualization module 306 and the emulation module 306 including infection vectors, and vulnerability vectors. The security server 108 may also provide the user with threshold reasoning which is further described regarding FIG. 4.

Figure 4:
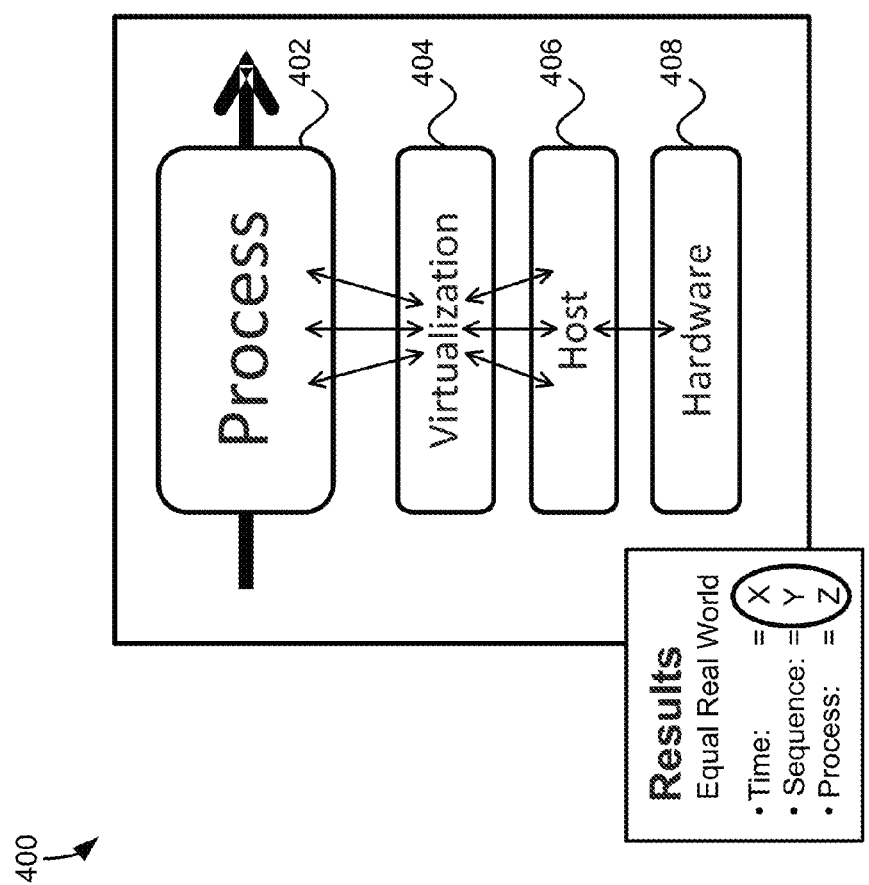
FIG. 4 is a conceptual block diagram of a virtualization module in some embodiments.

FIG. 4 is a conceptual block diagram 400 of a virtualization module in some embodiments. In various embodiments, different processes 402 may be virtualized within one or more virtualization environments 404. The virtualization environments execute on a host 406 that runs over hardware 408 that is isolated from the suspicious data and/or processes. The control module 310 may identify various results to identify when suspicious behavior is present (e.g., value X), in what sequence the suspicious behavior occurs (e.g., value Y) and what process (e.g., value Z).

For example, a particular process 402 may be intercepted and tested in a variety of different virtualization environments 404. Each virtualization environment 404 may operate on a host 406 (e.g., operating system and/or virtual machine software) that executes over a digital device's hardware 408. The functions of the tested process may be isolated from the host 406 and hardware 408. Suspicious or untrusted behavior may be identified within the virtualization. A time of exploitation may be identified as value X, an exploited sequence may be identified as value Y, and a process of exploitation may be identified as value Z.

The X, Y, Z values may form a description of suspicious data or the process which may be used to measure the threat against a threat matrix. In some embodiments, an administrator may store a threat threshold, based on the threat matrix depending upon the level of risk that is acceptable. The threat matrix may be based on interactions with the operating system, time sequence, resources, or events. In some embodiments, the degree of malicious behavior may be determined based on a threat value (e.g., comprising a function including the X, Y, and Z values). In one example, the interactions with the OS, time sequences, types of interactions, and resources requested, may all be elements of the threat matrix. Once a threat value is determined, the threat value may be compared to a threat threshold to determine the degree of maliciousness and/or what actions will be taken. Those skilled in the art will appreciate that the threat threshold may be determined and/or generated based on an administrator's acceptable level of risk.

Time, sequence, and process values may be generated for each tested process or data. The time, sequence, and process values may be measured against the threshold using the threat matrix to determine a possible course of action (e.g., quarantine, generate a report, alert an administrator, or allow the process to continue unobstructed).

The X, Y, Z values may be compared to X, Y, Z values associated with the same suspicious data from the emulation environment. If the emulation environment values are different or divergent, further testing within the virtualization environment and/or the emulation environment may be required.

Figure 5:
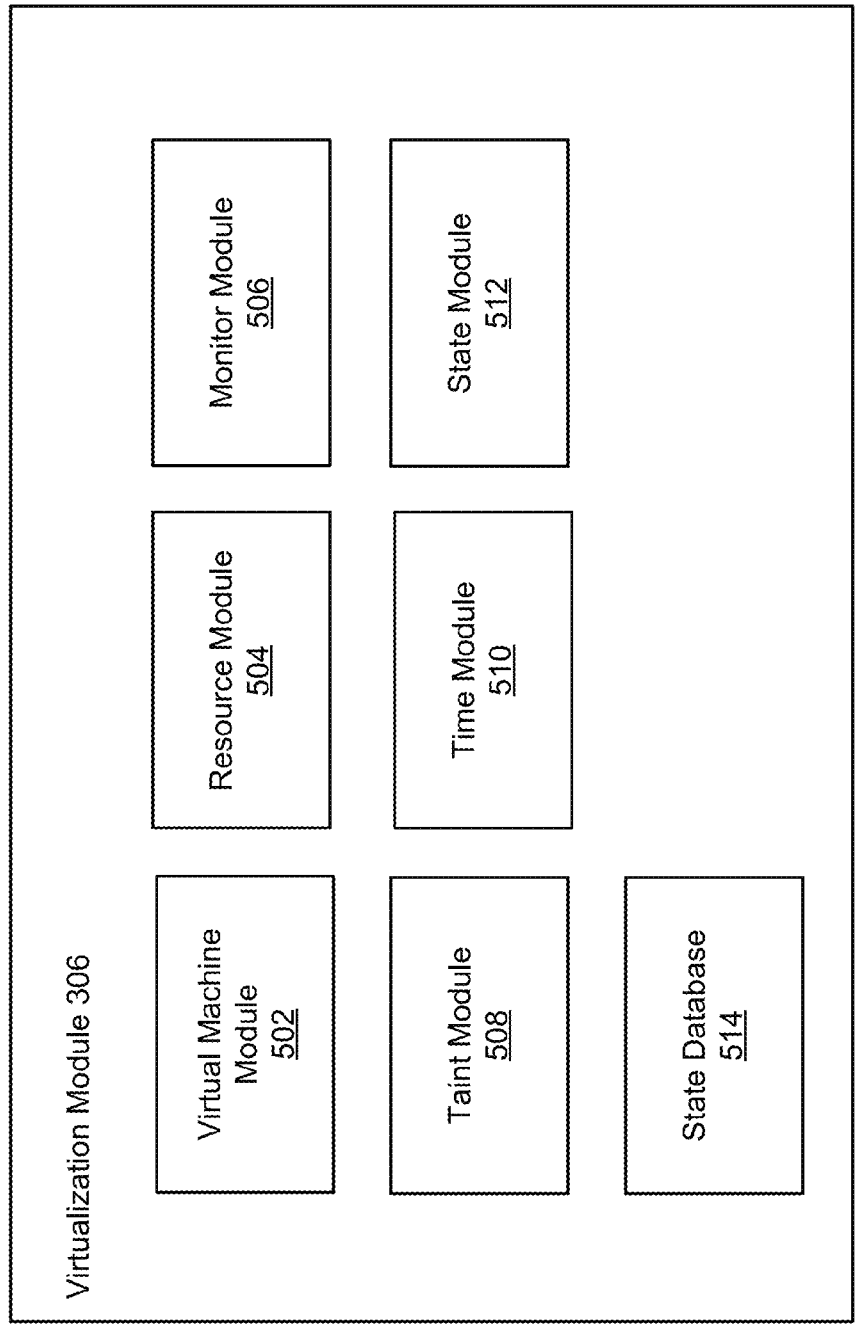
FIG. 5 is a block diagram of an exemplary virtualization module in some embodiments.

FIG. 5 is a block diagram of an exemplary virtualization module 306 in some embodiments. The virtualization module 306 may comprise a virtual machine module 502, a resource module 504, a monitor module 506, a taint module 508, a time module 510, a state module 512, and a state database 514.

The virtual machine module 502 is configured to generate one or more virtualization environments to process and monitor suspicious data. Those skilled in the art will appreciate that many different virtual machines may be used (e.g., VMWARE® virtual machines or custom virtual machines).

The resource module 504 is configured to provision one or more virtualization environments with plug-ins or other resources. In various embodiments, plug-ins are modules built in the virtual and emulation environments that collect specific data sets from certain system components. This process may be chained to follow an execution through the system or may run in parallel if there is a threaded malicious or clean object.

In some embodiments, the resource module 504 provisions a virtualization environment with an initial set of resources (e.g., operating system, OS updates, applications, and drivers). In some embodiments, the resource module 504 provisions virtualization environments to include resources based on the destination of the suspicious data (e.g., the digital device targeted to receive the suspicious data), device images provisioned by information technology management, or metadata associated with the suspicious data. In some embodiments, the resource module 504 comprises a pre-processing module that determines specific requirements based on network meta-data to determine which plug-ins should be implemented within the virtualization environment and in what combination the plug-ins may be launched.

In some embodiments, the resource module 504 provisions a virtualization environment based on the suspicious data's similarity to malware or other suspicious data. In one example, the virtualization module 306 may scan and find that the suspicious data appears to be similar to previously tested suspicious data or malware. Subsequently, the resource module 504 may provision one or more virtualization environments to include resources with known vulnerabilities to monitor whether the suspicious data acts in a similarly untrusted manner.

In various embodiments, the resource module 504 provisions a virtualization environment based in part on metadata associated with the suspicious data. For example, the virtualization module 306 may receive or retrieve metadata associated with the suspicious data. The resource module 504 may determine, based on the metadata, that one or more applications are required for the suspicious data to function. Subsequently, the resource module 504 may provision one or more virtualization environments with the necessary applications and related support file (e.g., operating system, shared resources, or drivers).

Those skilled in the art will appreciate that multiple virtualized environments may be instantiated. Each of the virtualized environments may have one or more different resources. In one example, one virtualized environment may include INTERNET EXPLORER® browser v. 6 while another virtualized environment may include INTERNET EXPLORER® browser v. 7. Different virtualized environments may include, in some embodiments, different browser programs (e.g., MOZILLA® FIREFOX® browser), different operating systems (e.g., UNIX® operating system), and/or different drivers. The different virtualization environments may have similar applications or operating systems but different versions or different patches or updates. In this way, the same suspicious data may be processed using different resources. If the suspect data behaves differently with one browser than with another, then there is evidence that the suspicious data may be malware.

In various embodiments, suspicious data is processed in a plurality of different virtualized environments where each of the different virtualized environments includes a limited number of differences. As a result, if malware is only effective in the presence of INTERNET EXPLORER® browser v. 6.0 (i.e., there is a vulnerability in INTERNET EXPLORER® browser v. 6.0 that the malware is programmed to exploit), then the malware's behavior as well as the exploit may be identified.

The control module 310 may provision the virtualization module 306. In some embodiments, the control module 310 may review metadata associated with the suspicious data to determine resources to be available in one or more virtualization environments. Those skilled in the art will appreciate that the metadata may come from a variety of sources. For example, some metadata may be apparent from the suspicious data such as a file extension or calls associated with the suspicious data. In some embodiments, the control module 310 may retrieve information regarding the suspicious data in order to provision the virtualization environment. For example, the control module 310 may determine that the suspicious data may be similar to other malware or suspicious data and provision one or more virtualized environments in a manner to see if the newly acquired suspicious data behaves in an untrusted manner.

The control module 310 may also provision the emulation module 308. In some embodiments, the control module 310 may review metadata associated with the suspicious data to determine resources to be available in one or more emulation environments. The control module 310 may also provision an emulation environment based on the provisioning of one or more virtualized environments. For example, the control module 310 may provision the emulation environment based on a virtualized environment where the suspicious data may have behaved abnormally (e.g., in an environment with a specific version of an operating system, the suspicious data scanned one or more areas of memory and then terminated further operations). The emulation environment may, in some embodiments, share similar resources as what was provided in a virtualization environment.

The virtualization module 306 and/or the collection module 302 may determine resource requirements of or for the suspicious data. In various embodiments, the virtualization module 306 receives metadata associated with the suspicious data to determine resources as described herein. For example, the metadata may indicate that the network data is an executable to be run in a WINDOWS® operating system environment or the metadata may indicate that the network data is an executable file to be operated by a browser (e.g., a web application). The virtualization module 306 and/or the control module 310 may dynamically select a variety of resources to provision and instantiate a virtualization environment in order to process the network data and monitor actions.

In various embodiments, a resource may be missing from one, some, or all of the virtualized environments. For example, the suspicious data may require a different application to be able to execute. In some embodiments, the virtualization module 306 may halt a virtualization environment, dynamically provision the virtualization environment with the necessary resources, and re-instantiate the virtualized environment to monitor for changes in behavior of the suspicious data.

The monitor module 506 is configured to monitor the virtualization environments instantiated by the virtual machine module 502. In various embodiments, the monitor module 506 logs each step or function performed by or for the suspicious data within each virtualization environment. In various embodiments, the monitor module 506 logs each operation of the suspicious data, logs changes caused by the operation (e.g., what information is stored in memory and where in memory the information is stored), and logs at what time the operation occurred.

The monitor module 506 may compare the operations of the suspicious data in various virtualization environments during or after virtualization. When a divergence is identified between a virtualization environment and an emulation environment or between two virtualization environments, the monitor module 506 may generate a flag or track the results to identify if different operations perform untrusted actions.

The taint module 508 is configured to perform taint analysis and/or other techniques to identify and track operations provided by and for the suspect data. As a result, acts associated with the suspicious data, including executions by the suspect data and executions performed by an application or operating system for the suspect data are tracked and logged. By using dynamic taint analysis, the taint module 508 and/or the monitor module 506 may monitor actions to detect whether a value that is normally derived from a trusted source is instead derived by some operation associated with the suspect data.

For example, values such as jump addresses and format strings should usually be supplied by the code itself, not from external untrusted inputs. However, an attacker may attempt to exploit a program by overwriting these values with their own data. In various embodiments, the taint module 508 may initially mark input data from untrusted sources tainted, then monitor program execution to track how the tainted attribute propagates (i.e., what other data becomes tainted) and to check when tainted data is used in dangerous ways (e.g., use of tainted data as jump addresses or format strings which may indicate an exploit of a vulnerability such as a buffer overrun or format string vulnerability). In various embodiments, based on the taint analysis, the monitor module 506 may look for variable, string, particular component and feedback that causes a jump in the code.

In various embodiments, the monitor module 506 and/or the taint module 508 may be plug-ins within the virtualization environment. In one example, the resource module 504 may provision a monitoring plug-in and a taint analysis plug-in with one or more virtualization environments.

Those skilled in the art will appreciate that the virtualization module 306 (e.g., via the monitor module 506) may detect attacks at time of use in the virtualized environment as well as at the time of writing to memory. In some embodiments, the virtualization module 306 detects when a certain part of memory is illegitimately overwritten by the suspicious data at the time of writing to the memory.

The time module 510 provides system resources as expected by the object creating the perception of accelerated time within the virtualization and/or emulation environments. By increasing or slowing clock signals and processing, the suspicious data may be analyzed in a more detailed manner and/or in a faster time than if the clock signal was allowed to operate in real time.

In some embodiments, malware requires a passage of time. For example, some malware requires seconds, minutes, days, or weeks to pass before becoming active. The time module 510 may increase the clock time in the virtualization or emulation environments in order to trigger suspicious behavior.

Further, the time module 510 can slow clock time within the virtualization and/or emulation environments. For example, the time module 510 may take time slices to specifically identify and characterize processes that are taken by or for the suspicious data. In some embodiments, time slice information may be used to isolate an attack vector, describe the suspicious data, or determine the target of the attack. For example, time slice information may indicate that at a certain time and associated step, the suspicious data takes over a formerly trusted process. This information may be used to characterize malware such that when other suspicious data take similar action at the same time and associated step, the suspicious data may be classified as a similar type of malware. The time module 510 may also segment operations by or for the object in the virtualization environment and the emulation environment to simplify comparisons of operations between the virtualization environment and the emulation environment.

In various embodiments, the state module 512 tracks the various states of the virtualization environment (e.g., the time, date, process, as well as what was stored in memory where it was stored and when). In some embodiments, the virtual machine module 502 may halt a virtualization environment or instantiate a new virtualization environment utilizing the states of a previous virtualization. For example, the state module 512 may monitor the behavior of suspicious data which suspiciously terminates at time T. The virtual machine module 502 may instantiate a new virtualization environment. The state module 512 may perform dynamic state modification to change the new virtualization environment to include the logged states of the previous virtualization environment at time T. In some embodiments, the state module 512 and/or the time module 510 may increase the clock signal, decrease the clock signal, or simply change the clock signal depending on the processing of the suspicious data that needs to occur. As a result, the suspicious data may be allowed to execute in a similar environment at the desired time. Those skilled in the art will appreciate that the new virtualization environment may be slightly different (e.g., include and/or not include one or more resources) from the previous virtualization environment. In some embodiments, the virtual machine module 502 does not instantiate a new virtualization environment but rather halts the previous virtualization environment and re-instantiates the previous virtualization environment at a previously logged state with one or more resources.

The state database 514 is a database configured to store the state of one or more virtualization environments and/or one or more emulation environments. Those skilled in the art will appreciate that the state database 514 is not limited to databases but may include any data structure.

Once the control module 310 identifies the suspicious data as malware or otherwise untrusted, the control module 310 may continue to monitor the virtualized environment to determine the vector of attack of the malware, the payload of the malware, and the target (e.g., control of the digital device, password access, credit card information access, and/or ability to install a bot, keylogger, and/or rootkit). For example, the operations performed by and/or for the suspicious data may be monitored in order to further identify the malware, determine untrusted acts, and log the effect or probable effect.

If the behavior of the suspicious data is also suspicious, the virtualization module 306 may halt the virtualization environment and provide new resources. For example, if the suspicious data begins to execute a program but abruptly halts, prepares to run an executable but does not actually run the executable, or constantly checks a section in memory that should typically be empty, then the virtualization module 306 may instantiate new virtualization environments and/or re-provision existing virtualization environments with different resources to see if the suspicious data acts differently. In various embodiments, the emulation module 308 may instantiate an emulation environment to test the suspicious data.

In various embodiments, the virtualization module 306 tracks different behaviors by different suspicious data in order to identify complex attacks, distributed attacks and/or advanced persistent threats (APT). For example, one type of malware may store an executable in a specific place in memory and then, possibly much later, a second type of malware may access the stored executable and attack a computerized system. The virtualization module 306 may identify and record the behavior of suspicious data which, when executed in a virtualization environment, only stores an executable in a specific place in memory but performs no other functions. If other data is executed in the virtualization environment which checks that specific place in memory, the virtualization module 306 may halt the virtualization, provision the executable from the previous data in the specific location in memory, and re-run the virtualization environment to monitor changes.

Figure 6:
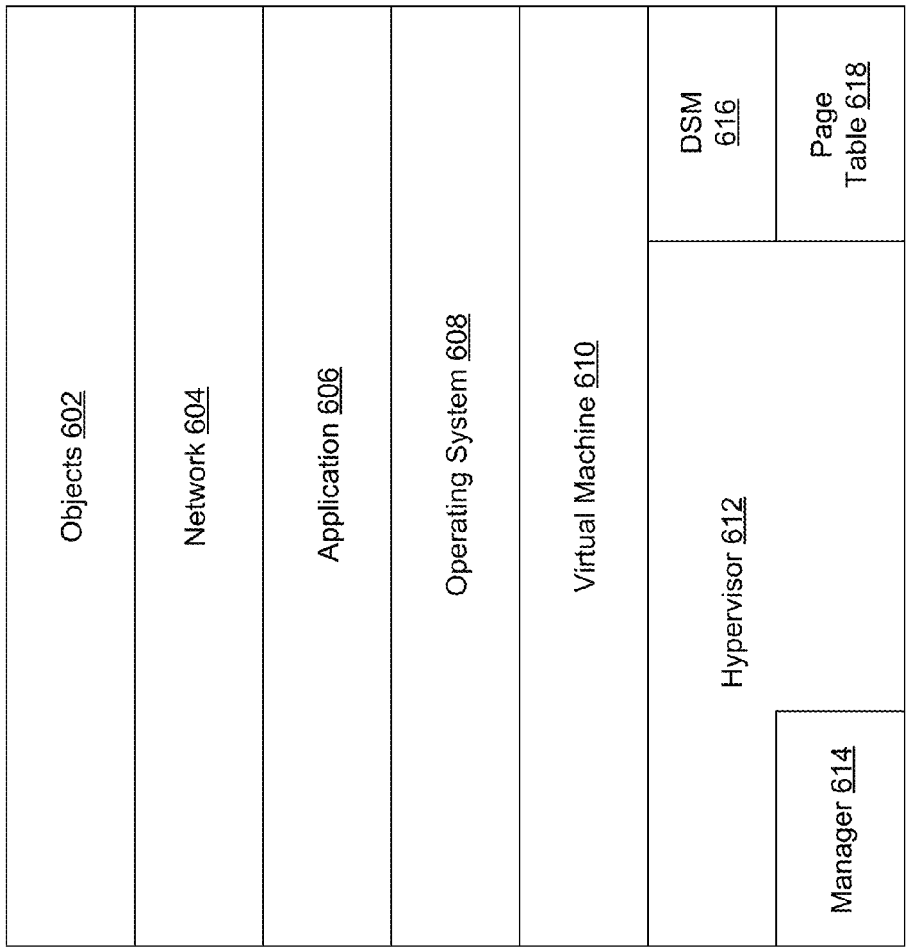
FIG. 6 is an exemplary virtualization environment for detection of malware in some embodiments.

FIG. 6 is an exemplary virtualization environment 600 for detection of malware in some embodiments. The virtualization environment 600 comprises objects 602, a network 604, applications 606, operating system 608, a virtual machine 610, a hypervisor 612, a manager 614, a dynamic state manager 616, and a page table manager 618. Objects include, but are not limited to, suspicious data and/or processes that are tested in the virtualization environment 600. The network 604 comprises resources to allow the objects 602 to function and/or operate with access to network resources (e.g., network drivers and ports).

The applications 606 include one or more applications or other resources that function with the objects 602 to operate in the virtualization. The applications may include word processing applications, web browsers, applets, scripting engines, and the like. Different virtualization environments may include different applications and/or different versions. For example, one virtualization environment may comprise INTERNET EXPLORER® browser v. 9 while another virtualization environment may comprise MOZILLA® FIREFOX® browser v. 5.0. In another example, one virtualization environment may comprise INTERNET EXPLORER® browser v. 9 while three other virtualization environments may comprise v. 8, v. 7, and v. 6 of the INTERNET EXPLORER® browser, respectively.

The operating system 608 includes all or part of the operating system necessary for the objects 602 to function within the virtualization. The operating system may include, for example, the UBUNTU® LINUX®, WINDOWS XP®, or OS X MOUNTAIN LION™ operating systems. Different virtualization environments may include different operating systems 608, and/or include different versions of operating systems 608 (e.g., WINDOWS XP® and WINDOWS® 7.0 operating systems). Further, different virtualization environments may include different applied patches and upgrades.

The virtual machine 610 may include any number of virtual machines configured to generate one or more virtualization environments to process the objects 602. The hypervisor 612, kernel, or virtual machine manager, manages resources for the virtualizations and may allow multiple operating systems (e.g., guests) to run concurrently on the host computer. The hypervisor may manage execution of the guest operating systems.

The manager 614 is configured to manage monitoring and control the virtualization environment 600. In various embodiments, the control module 310 controls the virtualization environment 600, including the provisioning, time acceleration, and logging through the manager 614.

The dynamic state manager 616 (i.e., DSM) tracks and logs the state of the machine. The DSM may also store the state for later use within the same or different virtualization environments (e.g., for dynamic state modification). The state may include, for example, the object or object identifier, resources available, time slices when events occurred, and logged events. The DSM 616 may also comprise contents in memory, and locations of contents in memory over time.

The page table manager 618 may receive one or more page tables from the emulation environment. In various embodiments, the object may be tested within both the virtualization environment and the emulation environment. Upon detection of a divergence of operations between the operations of the virtualization environment and the operations of the emulation environment, the emulation module 308 may log the state of the emulation environment and pass the state information to the virtualization environment 600 as a page table for dynamic state modification of the virtualization environment. In some embodiments, the virtualization module 306 re-instantiates the original virtualization environment (e.g., instantiates a modified image of the virtualization environment) and dynamically modifies the state of the virtualization environment using the page table(s) from the emulation environment or the virtualization module 306 may instantiate a new virtualization environment and load the information from the page table.

Figure 7:
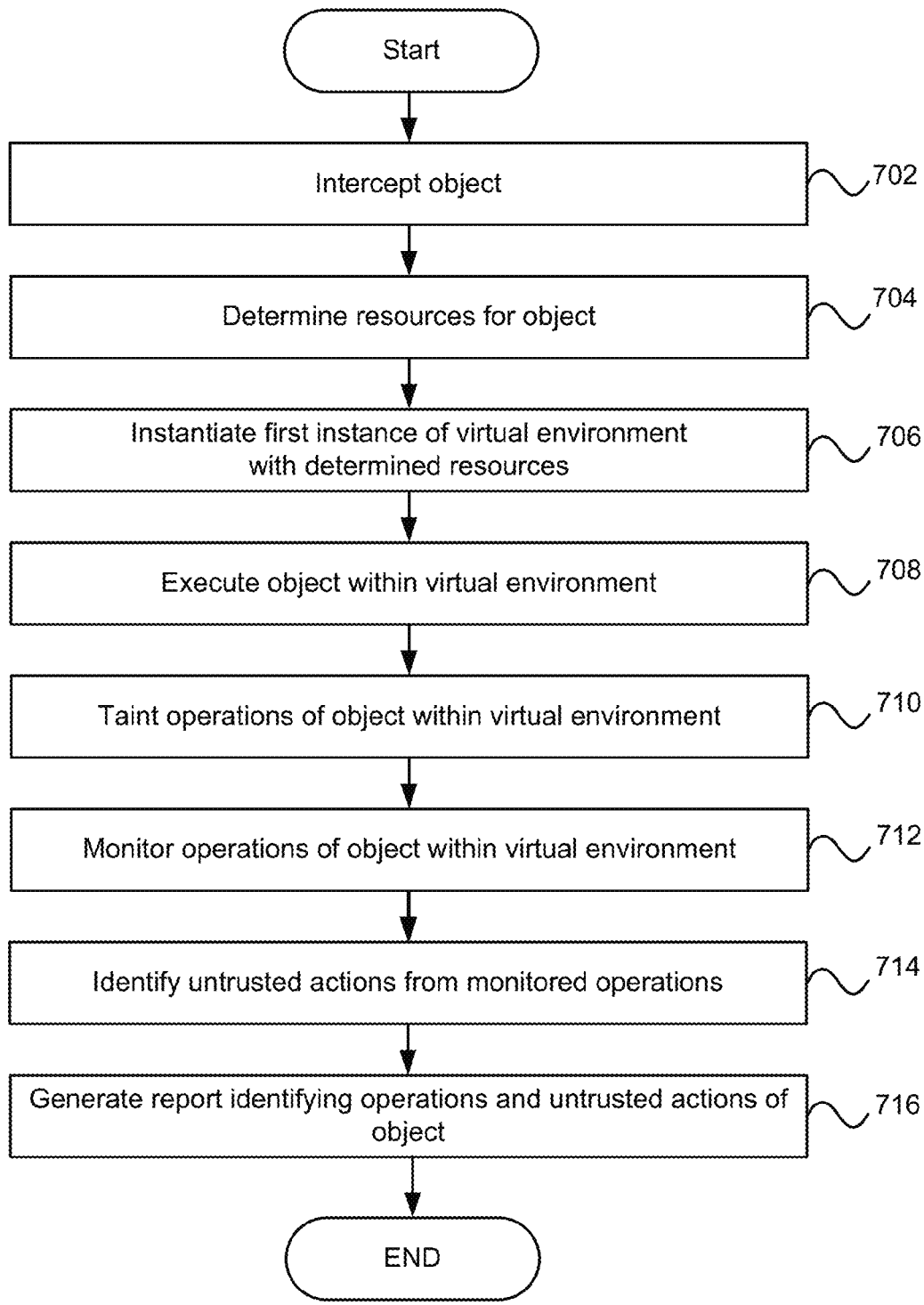
FIG. 7 is a flow diagram of an exemplary malware detection method.

FIG. 7 is a flow diagram of an exemplary malware detection method. In step 702, an object is intercepted by a data collector. The data collector may be placed on any digital device and/or network device. In step 704, the resource module 504 inspects what resources the object may require for processing (e.g., dynamic libraries and/or registries the object may affect). In some embodiments, the collector includes metadata including where the object came from, where the object was to be received, and/or what application created the request. The resource module 504 may perform preprocessing by determining what resources are required based on the metadata.

In step 706, the virtual machine module 502 instantiates a first instance of a virtualization environment with one or more resources identified by the resource module 504. In one example, the virtual machine module 502 selects and initiates plug-ins within the virtualization environment for memory allocation, forensics, mutex, filesystem, monitoring, taint analysis, and the like. In step 708, the object is executed and/or processed within the virtualization environment.

In step 710, the taint module 508 taints operations of the object within the virtualization environment. The taint module 508 may be a plug-in. In some embodiments, the taint module 508 taints the object, bit by bit, with trace capture information. In step 712, as data propagates through the application, the monitor module 506 monitors the operations assessing what resources were previously allocated and what resources are actually allocated and called within the virtualization environment.

Resources that are required and/or called by the object which were not initially provisioned may be assessed as further evidence of malware. In some embodiments, sets of newly requested resources may be assessed to determine the likelihood of malware. For example, a particular set of resources may be determined to be malicious. If an object calls that particular set of resources (e.g., by calling resources that have not been initially provisioned, calling resources that were initially provisioned, or calling a combination of resources of which only a few were initially provisioned), the object may be determined to be malicious.

In step 714, the monitor module 506 may identify untrusted actions from monitored operations. The monitor module 506 may be a plug-in. In various embodiments, the virtual machine module 502 may load only those resources called by the resource module 504 within the virtualization environment. If the object calls a driver that is not originally provided in the virtualization environment (e.g., the object went outside of the original boundaries or the initially accepted criteria), the object's operations may terminate. In some embodiments, the virtualization environment is re-instantiated or a new virtualization environment may be instantiated that includes the additionally called resource to further process and monitor the operations of the object.

In some embodiments, the object runs in a plurality of virtualization environments until all operations called on by or for the object are completed. The control module 310 may compare the operations performed by or for the object in one virtualization to actions performed in another virtualization to analyze for divergence. If the actions taken were similar between the two virtualization environments, then no divergence was found. If the actions taken were different, divergence is found and the differences may be further assessed (e.g., found untrusted actions taken when an unpatched operating system was present).

Divergence may be evidence of malware. For example, if the object ceases to perform any operations at time T in one virtualization environment but continues to perform many additional operations after time T in another virtualization environment (e.g., use of different resources, point to different points in memory, open a socket, or open up output ports), the difference in the environment (e.g., an available exploit) likely influenced the actions of the object and, as such, vulnerabilities may be identified.

In some embodiments, the operations taken for or by the object within the virtualization environment may be measured to determine a threat value. The threat value may be compared to a customizable threshold to determine if the behavior of the object is untrustworthy. In some embodiments, the threat value is determined based on X values and Y values. The X values may include those operations taken by a plug-in while the Y value correlates to the plug-in and the virtualization environment (e.g., operating system, kernel, or hypervisor). These two values may be part of a function to determine the threat value of each operation by or for the object, an entire execution path of the object, or a part of the execution path of the object. In one example, operations taken by or for an object may be weighted based on a matrix of actions regarding an operation system, application, network environment, or object. The threat value may be compared to a threat threshold to determine if the effect of the object within the virtualization environment is sufficiently trustworthy or if the object is behaving in a manner that is sufficiently suspicious to warrant running the object through the emulation environment. Further, the threat value may be compared to the threat threshold to determine that the operations are such that they may be characterized as untrusted and, therefore, the object may be quarantined and further corrective action may be taken.

In various embodiments, the threat value associated with one or more objects may be increased (e.g., determined to be more threatening and, therefore, indicative of an increased likelihood of maliciousness) based on the resources called by the object. As discussed herein, for example, a particular set of resources may be determined to be malicious. If an object calls that particular set of resources, a threat value associated with the object may signify a significantly increased likelihood of maliciousness.

In step 716, the reporting module 312 generates a report identifying operations and untrusted actions of the object. The reporting module 312 may generate a report identifying the object, the payload, the vulnerability, the object of the attack, recommendations for future security, and so on.

Those skilled in the art will appreciate that using signatures to identify suspicious data or malware may be optional. For example, suspicious data may be provided to the virtualization environment. If the suspicious data behaves in a manner similar to known malware, a class of malware, or a class of data with suspicious behavior, then the object may be quarantined and remedial action taken (e.g., the user of the target digital device may be notified). In some embodiments, the process of testing the suspicious data within a virtualization environment to determine a potential threat may be faster than utilizing signatures in the prior art.

Figure 8:
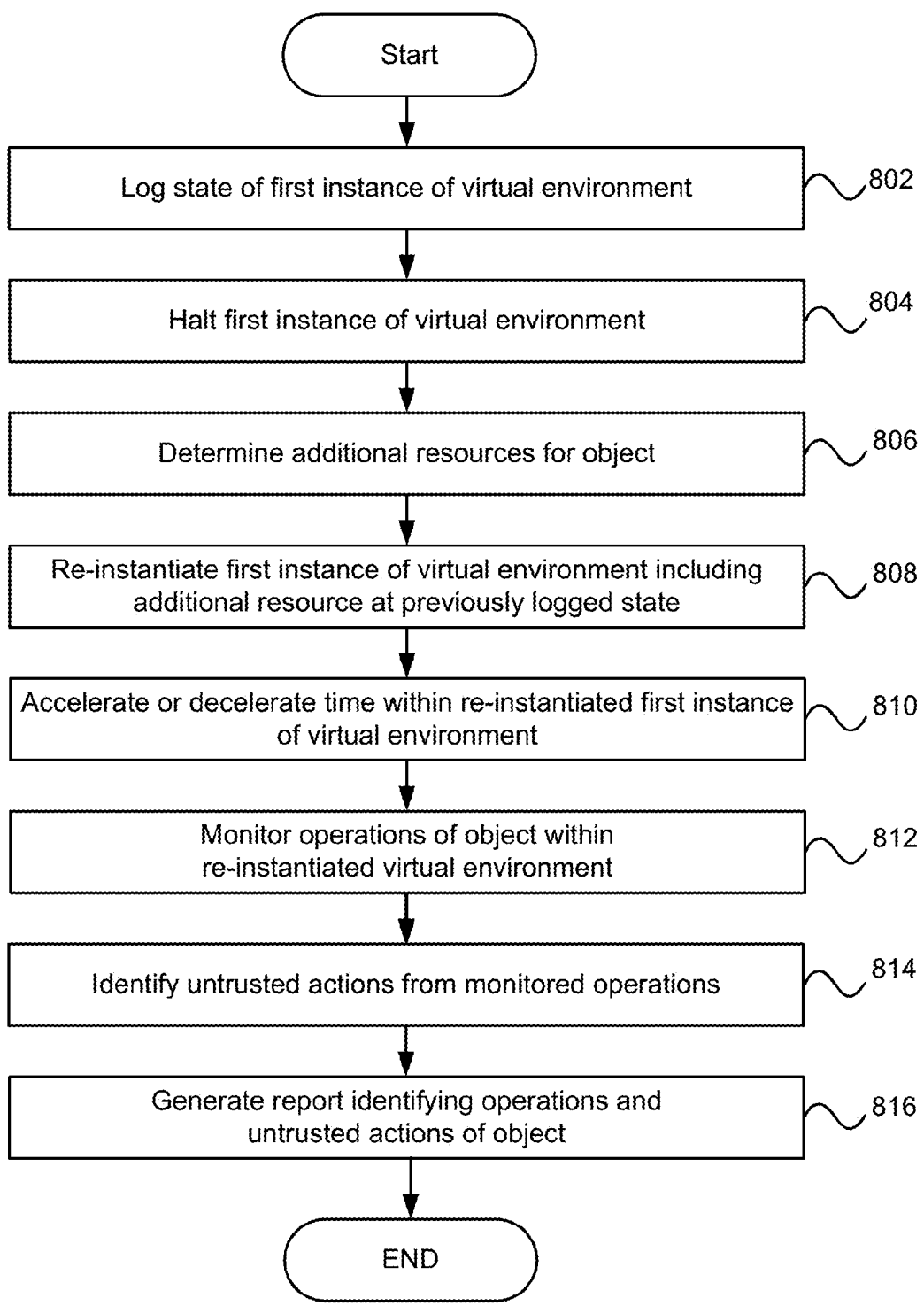
FIG. 8 is a flow diagram of an exemplary method of controlling a virtualization environment to detect malware.

FIG. 8 is a flow diagram of an exemplary method of controlling a virtualization environment to detect malware. In step 802, the state module 512 may log a first instance of the virtualization environment. For example, the state module 512 may log or track the state of the virtualization environment (e.g., time, memory values, location of data within memory, and/or ports called). The state module 512 may log the state of a plurality of virtualization environments operating in parallel.

In step 804, the virtual machine module 502 may halt the first instance of the virtualization environment. For example, the object may have terminated functions after requesting a resource not originally provided in the first instance of the virtualization environment. In some embodiments, the request for a resource not originally provisioned is evidence of malware (e.g., requesting access to a resource that the object should not have reason to access). In various embodiments, the virtual machine module 502 may permit the first instance of the virtualization environment to continue running and the virtual machine module 502 may instantiate a new instance of the virtualization environment.

In step 806, the resource module 504 determines additional resources for the object. For example, if the object requests a resource not originally provided in the first instance of the virtualization environment, the resource module 504 may identify the desired additional resource. In various embodiments, if a divergence is also detected with another virtualization environment, the resource module 504 may also identify differences in resources between the first and other virtualization environments.

In step 808, the virtual machine module 502 re-instantiates the first instance of the virtualization environment including the previously identified resources at the previously logged state. As a result, the object may be presented with an environment that may appear to be unprotected. Further, in step 810, the time module 510 may accelerate the clock signal to the time the object requested the unavailable resource.

In step 812, the monitor module 506 may monitor operations by or for the object within the re-instantiated virtualization environment. In some embodiments, the monitor module 506 monitors the operations by or for the object as if the virtualization environment had not changed. In some embodiments, a plug-in monitors the operations by or for the object and provides information to the monitor module 506. In step 814, the monitor module 506 may identify untrusted actions from monitored operations. As discussed herein, the operations, either taken alone or in combination, may be used to determine a threat value. The threat value may be compared to a threat threshold to determine if the object is behaving suspiciously, not behaving suspiciously, or behaving in an untrustworthy manner.

In step 816, the reporting module 312 may generate a report identifying suspicious or untrusted operations as well as any untrusted actions (e.g., vulnerability exploits, target of payload, defenses of the object and so on).

Those skilled in the art will appreciate that the first instance of the virtualization environment may not be halted. In some embodiments, a new instance of the virtualization environment is instantiated (without halting the previous instance) including the state information and the like. In various embodiments, the first instance of the virtualization environment is halted and then re-instantiated including the state information.

Figure 9:
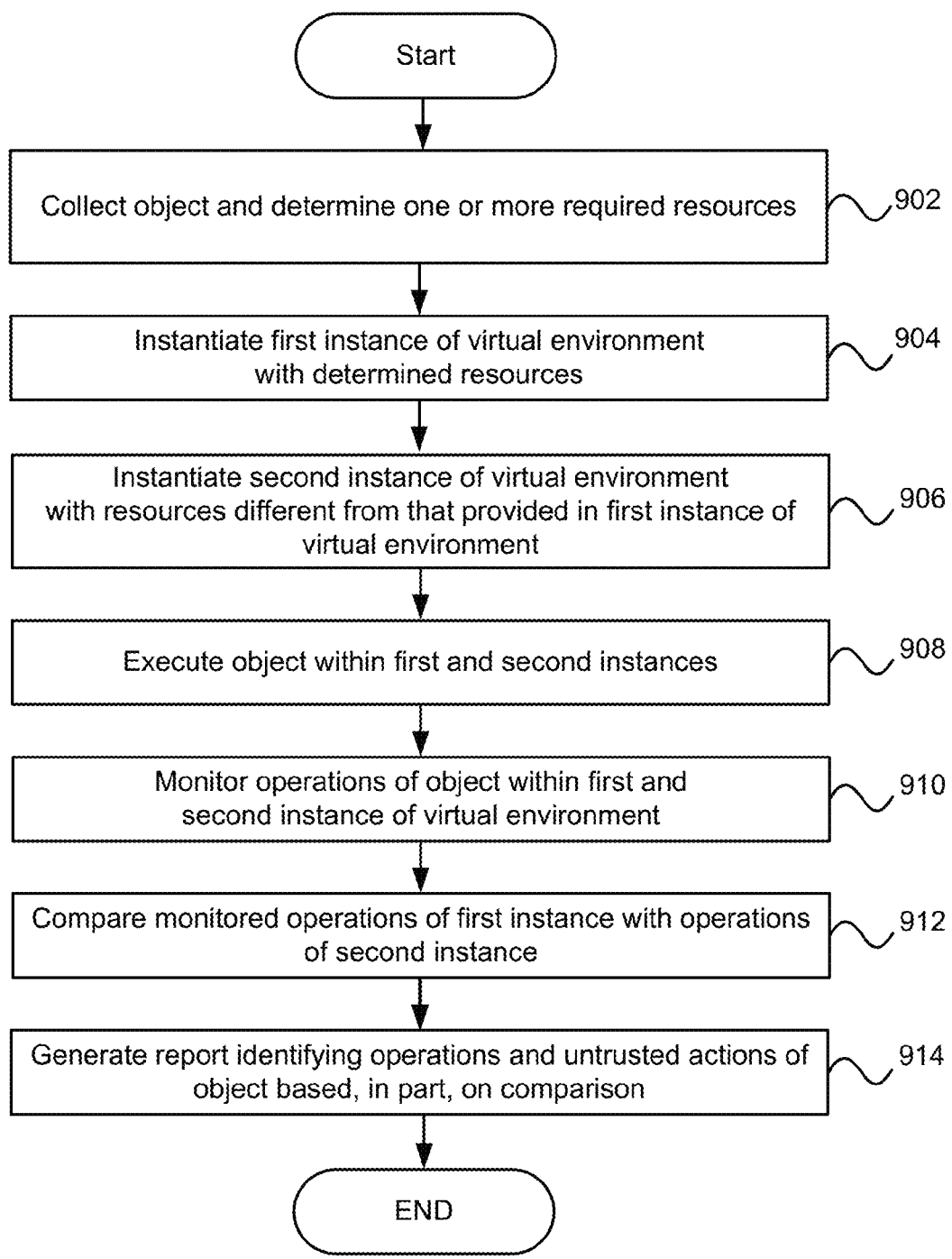
FIG. 9 is a flow diagram of an exemplary model to detect malware through multiple virtualization environments.

FIG. 9 is a flow diagram of an exemplary model to detect malware through multiple virtualization environments. In step 902, the collection module 302 collects the object and the resource module 504 determines one or more required resources.

In step 904, the virtual machine module 502 may instantiate the first instance of the virtualization environment with the determined resources. Further, in step 906, the virtual machine module 502 may instantiate a second instance of the virtualization environment but with resources that are different from that provided in the first instance of the virtualization environment. For example, versions of applications may be different, operating system patches, may be different, or the like.

In step 908, the virtual machine module 502 executes the object within the first and second instances of the virtualization environment. In step 910, the monitor module 506 may monitor operations of the object within the first and second virtualization environments. In various embodiments, the monitor module 506 traces the operations of the object in both virtualization environments. As discussed herein, a trace may be based on X values (e.g., operations by or on a plug-in of the virtualization environment) and Y values (e.g., operations between an operating system of the plug-in which may be coordinated with the X values). In some embodiments, not all operations are relevant. In some embodiments, one or more actions or operations by the host during processing may be compared against a check system to determine if the action or operation is relevant. If the action or operation is relevant, then the action or operation may be given weight and may affect the trace. In various embodiments, the one or more actions or operations by the host during processing may be compared against a check system to determine if the action or operation is not relevant. If the action or operation is not relevant, then the action or operation may be given no weight and may not affect the trace.

In step 912, the control module 310 or the monitor module 506 compares the operations of the first instance and the operations of the second instance to determine divergence. In one example, the traces of the object in the respective virtualization environments may form an execution tree which may be compared to other execution trees associated with other virtualization environments.

In one example, divergence between the traces of the two virtualization environment may be found. In various embodiments, the control module 310 may halt one or both of the virtualization environments and may notify an administrator of malware. In some embodiments, the control module 310 continues processing the object within one or both virtualization environments to further identify characteristics of the suspicious data, targeted vulnerabilities, payload, goal, or the like.

In step 914, the reporting module 312 generates a report identifying operations suspicious behavior, and/or untrusted actions of the object based, in part, on the comparison. For example, the reporting module 312 may identify the exploit that is present in some digital devices but not others. Further, the report may include recommendations to improve security (e.g., moving valuable information to a more secure location).

FIG. 10 is a block diagram of an exemplary digital device 1000. The digital device 1000 comprises a processor 1002, a memory system 1004, a storage system 1006, a communication network interface 1008, an I/O interface 1010, and a display interface 1012 communicatively coupled to a bus 1014. The processor 1002 is configured to execute executable instructions (e.g., programs). In some embodiments, the processor 1002 comprises circuitry or any processor capable of processing the executable instructions.

The memory system 1004 is any memory configured to store data. Some examples of the memory system 1004 are storage devices, such as RAM or ROM. The memory system 1004 can comprise the RAM cache. In various embodiments, data is stored within the memory system 1004. The data within the memory system 1004 may be cleared or ultimately transferred to the storage system 1006.

The storage system 1006 is any storage configured to retrieve and store data. Some examples of the storage system 1006 are flash drives, hard drives, optical drives, and/or magnetic tape. In some embodiments, the digital device 1000 includes a memory system 1004 in the form of RAM and a storage system 1006 in the form of flash data. Both the memory system 1004 and the storage system 1006 comprise computer readable media which may store instructions or programs that are executable by a computer processor including the processor 1002.

The communication network interface (com. network interface) 1008 can be coupled to a network (e.g., communication network 114) via the link 1016. The communication network interface 1008 may support communication over an Ethernet connection, a serial connection, a parallel connection, or an ATA connection, for example. The communication network interface 1008 may also support wireless communication (e.g., communication using the 802.11 a/b/g/n standard or the WIMAX® standard). It will be apparent to those skilled in the art that the communication network interface 1008 can support many wired and wireless standards.

The optional input/output (I/O) interface 1010 is any device that receives input from the user and output data. The optional display interface 1012 is any device that is configured to output graphics and data to a display. In one example, the display interface 1012 is a graphics adapter. It will be appreciated that not all digital devices 1000 comprise either the I/O interface 1010 or the display interface 1012.

It will be appreciated by those skilled in the art that the hardware elements of the digital device 1000 are not limited to those depicted in FIG. 10. A digital device 1000 may comprise more or fewer hardware elements than those depicted. Further, hardware elements may share functionality and still be within various embodiments described herein. In one example, encoding and/or decoding may be performed by the processor 1002 and/or a co-processor located on a GPU (e.g., an NVIDIA® GPU).

Figure 11:
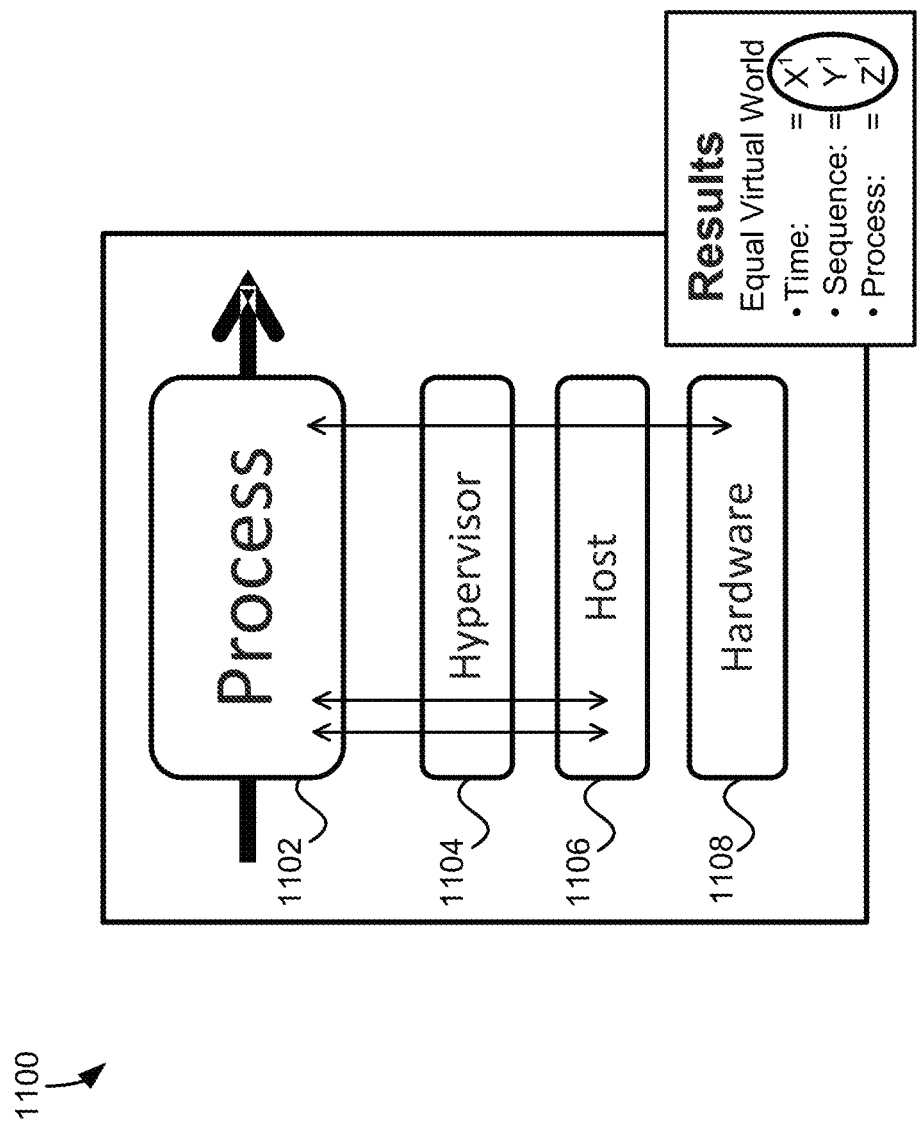
FIG. 11 is a conceptual block diagram of an emulation environment in some embodiments.

FIG. 11 is a conceptual block diagram of an emulation environment 1100 in some embodiments. The emulation environment 1100 may be instrumented and allow the object direct access to memory. As a result, malware that searches for evidence of virtualization or evidence of a security program may conclude that a target machine is sufficiently unprotected and, as such, may engage malicious behavior without early termination.

The emulation environment 1100 comprises the process 1102 being tested, the hypervisor 1104, the host 1106, and the hardware 1108. The process 1102 may comprise the functions of or for an object received from the virtualization module 306.

The hypervisor 1104 may provision the emulation environment 1100 and synchronize operations between one or more virtualization environments and the emulation environment 1100. In some embodiments, the hypervisor 1104 initially provisions the emulation environment based on metadata associated with the data to be assessed and/or resources identified within the virtualization environment(s).

In some embodiments, the hypervisor 1104 may be an emulation manager configured to control the emulation environment. In one example, the hypervisor 1104 may redirect commands between the process 1102, host 1106 and/or hardware 1108. In various embodiments, the hypervisor 1104 may receive trace information from a trace capture plug-in within the emulation environment 1100 to trace behavior of the object (e.g., commands from and/or responses to the object in the emulation environment 1100). In various embodiments, the hypervisor 1104 is a kernel.

The host 1106 comprises the host system (e.g., operating system), support applications, and other data at the O/S layer. The hardware 1108 includes the drivers and hardware interfaces at the hardware layer.

In various embodiments, the hypervisor 1104 determines trace values to compare against the trace values of the virtualization environment. Since the emulation environment is not a virtualization environment, the object may behave in a different manner and, as such, the trace values between the emulation environment and the virtualization environment may be different. In various embodiments, a control module 310 may perform divergence analysis by comparing the trace values from the virtualization module 306 and the emulation module 308. If the values are different, the control module 310 may halt the virtualization environment to control the virtualization and include one or more responses recorded in the emulation environment which is further discussed herein.

Those skilled in the art will appreciate that there may be any number of emulation environments. For example, there may be multiple emulation environments operating on one or more digital devices.

As discussed herein, the emulation module 308 may generate trace values to compare with tracing of the object in the virtualization environment to detect divergence. In some embodiments, the events associated with the object may be evaluated based on a time value X', a sequence value Y' and a process value Z'. These values may be compared to values of the virtualization environment to identify divergence. Divergence detection is further discussed herein.

Figure 12:
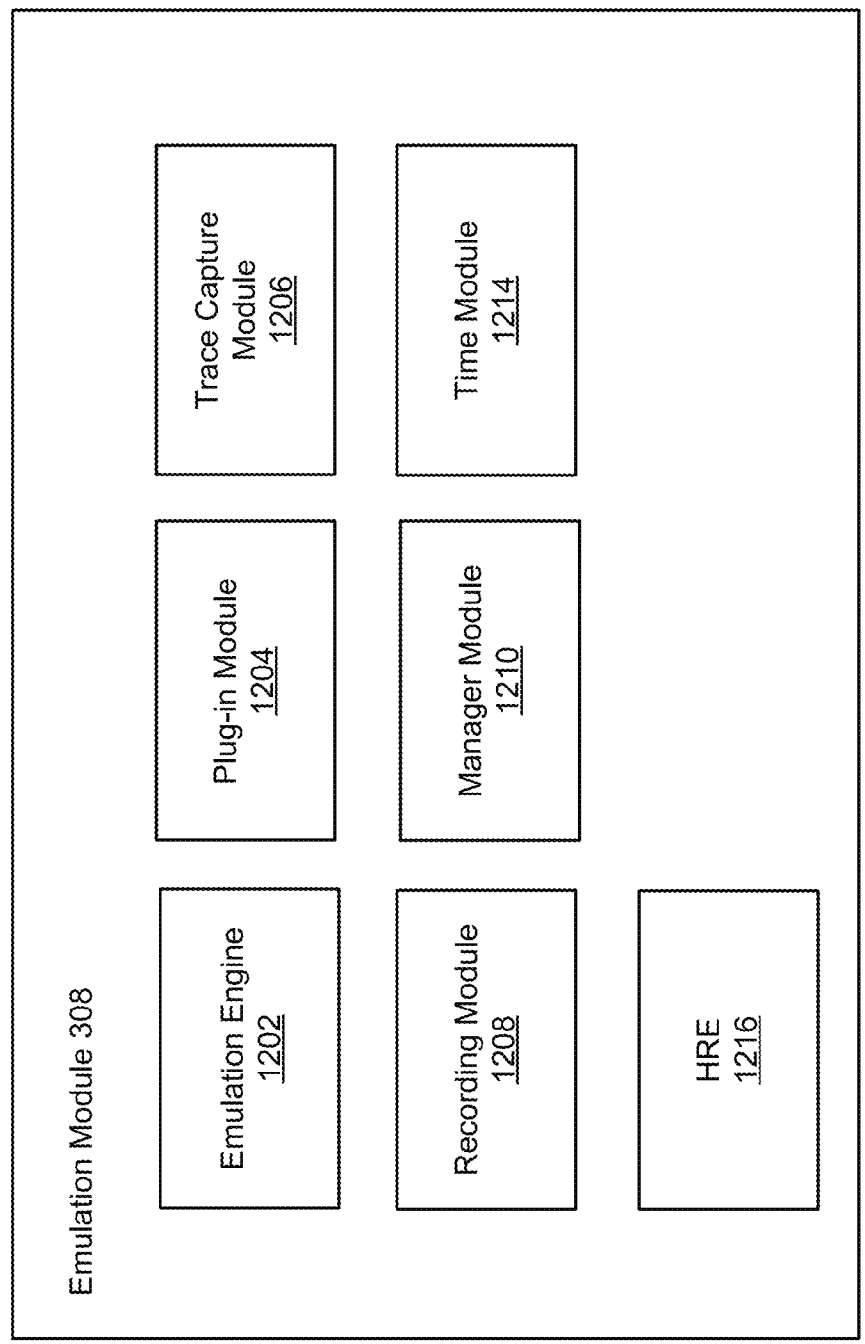
FIG. 12 is a block diagram of an exemplary emulation module in some embodiments.

FIG. 12 is a block diagram of an exemplary emulation module 308 in some embodiments. The emulation module 308 comprises an emulation engine 1202, a plug-in module 1204, a trace capture module 1206, a recording module 1208, a manager module 1210, a time module 1214, and a hierarchical reasoning engine (HRE) 1216.

The emulation module 308 implements an emulation environment and may be instrumented (e.g., via plug-ins that operate with and/or within the emulation environment). The emulation module 308 may allow an object direct memory access. The emulation module 308 may instantiate any number of emulation environments. In one example, the emulation module 308 operates three different emulation environments in parallel.

The plug-in module 1204 is configured to load one or more plug-ins into the emulation environment to process the object. The plug-ins may include application-layer information (e.g., Adobe, shared drivers, and mutex), network information (e.g., available port), and the like. In various embodiments, the plug-in module 1204 does not comprise plug-ins for security or tracking operations which may be detected by the object. There may be any number of plug-ins for a given emulation environment. In some embodiments, there are eight initial plug-ins in the emulation environment.

In some embodiments, the resource module 504 of the virtualization module 306 provides a list of required resources and/or metadata to the plug-in module 1204. The plug-in module 1204 may provision the emulation environment based in part on the information received from the resource module 504, the object, and/or metadata associated with the object. In some embodiments, the resource module 504 is a hypervisor.

The trace capture module 1206 is configured to track an execution path for the object. For example, the trace capture module 1206 may trace actions taken for and by the object in the emulation module 308. In various embodiments, the trace capture module 1206 may be within the hypervisor layer, be a plug-in, or be a combination of both. As a result, the trace capture module 1206 and/or the functions of the trace capture module 1206 may be invisible to the object.

In various embodiments, the trace capture module 1206 traces the operations of and for the object in the emulation environment. As discussed herein, the trace capture module 1206 may generate a trace for the object in the emulation environment based on actions of the plug-ins (e.g., an X trace) and actions taken that correlate between the emulation environment and the plug-ins (e.g., a Y trace). This trace capture process may be similarly taken in the virtualization environment where the X trace may be associated with actions of the plug-ins of the virtualization environment and the Y trace may be associated with actions that correlate between the virtualization environment and the plug-ins. The manager module 1210 may compare the trace for the object in the emulation environment to a trace for the object in the virtualization environment to detect divergence.

In various embodiments, the trace for the object in the emulation environment and/or virtualization environment may be filtered such that all actions taken in the emulation environment and/or virtualization environment are not necessary to generate the trace. For example, all of the actions taken by the host system during processing of the object may not be relevant to trace. In some embodiments, the trace capture module 1206 may generate a trace based on relevant actions or operations. In one example, the trace capture module 1206 filters the actions and operations of the host and/or one or more plug-ins during processing of the object. In some embodiments, one or more actions or operations by the host during processing may be compared against a check system to determine if the action or operation is relevant. If the action or operation is relevant, then the action or operation may be given weight and may affect the trace. If the action or operation is not relevant, then the action or operation may not be considered when developing the trace. Those skilled in the art will appreciate that similar filtering may occur in determining the trace in the virtualization environment.

The recording module 1208 may record operations by or for the object in the emulation environment. In some embodiments, the recording module 1208 records responses to the object within the emulation environment (e.g., responses from the host). The recording module 1208 may also track the state of the emulation environment (e.g., what is stored in memory, where in memory is data stored, and/or time of operation(s)). Those skilled in the art will appreciate that the recording module 1208 may record any kind of information including information from the object, information for the object, or information generated on behalf of the object.

The time module 1214 may record time of events, record time states of actions or operations in the emulation environment, and may accelerate time (e.g., the clock signal) within the emulation environment to detect changes in the behavior in the object. For example, some malware is configured to wait a predetermined period of time before acting maliciously. In some embodiments, the time module 1214 may accelerate one or more clock signals in the emulation environment such that the object is given a period of time to trigger untrusted behavior.

When divergence is detected based on a comparison of traces of the virtualization environment and the emulation environment, the virtualization module 306 may re-instantiate the virtualization environment. In various embodiments, the state of the emulation environment, including the resources, data in memory, locations of data in memory, clock signal, and/or the like may be loaded into the virtualization environment upon re-instantiation. The virtualization environment may begin to process the object at the time (or the time preceding) the divergence between the virtualization environment and the emulation environment. The object may be given at least part of the recorded information from the emulation environment. The recorded information may include all or part of a response to the object at the time divergence was detected. Those skilled in the art will appreciate that the object may receive the response and act within the virtualization environment as if the object had been received by the target system and a proper response was received. Subsequently, the virtualization module 306 may continue to trace the behavior of the object within the virtualization environment. The new trace may also be compared to the trace of the emulation environment to determine if a divergence is found. If there is no divergence, the virtualization environment may continue to process the suspicious data to look for untrusted behavior.

In some embodiments, the virtualization module 306 and the emulation module 308 may operate the virtualization environment and emulation environment in parallel. For example, after an object is identified as behaving suspiciously, then an emulation environment may be instantiated for processing the object. When a divergence between the virtualization environment and the emulation environment is detected, the virtualization environment may be re-instantiated (e.g., the instance of the virtualization environment may be restarted or a new virtualization environment may be instantiated) with some of the recorded information from the emulation environment. The virtualization environment and emulation environment may continue to process the object in parallel. If a new divergence is detected between the two environments, the emulation environment and/or the virtualization environment may halt and the virtualization environment re-instantiated with new recorded information and/or new state information from the emulation environment. The process may continue until the processing of the object is completed.

In various embodiments, once the virtualization environment is re-instantiated, the emulation environment may be halted or terminated until or unless the object is determined to be behaving in an untrusted manner.

The HRE 1216 may be configured to determine maliciousness or provide information that may increase a threat value associated with the object being processed. In some embodiments, the HRE 1216 assesses the behavior of the data being processed. In one example, the HRE 1216 assesses requests for resources that deviate from the initially identified resources, assesses deviations between the virtualization environment and emulation environment, and assesses the significance of a series of actions. If combinations of resources calls and/or actions have been identified as malicious, then the HRE 1216 may flag the data as malicious or increase one or more threat values.

In various embodiments, sets of resources, sets of requested resources not initially provisioned, and/or sets of actions performed by a suspicious object may be associated with malicious behavior. In one example, sets of resource and/or actions may be identified as malicious or have an increased likelihood of being malicious. The HRE 1216 may review the activities of an object within the virtualization environment and/or emulation environment to determine if a set of requested resources and/or actions are similar to known malicious sets of resources and/or actions. If the HRE 1216 identifies a set of requested resources and/or actions as being malicious, the HRE 1216 may provide threat information that maybe heavily weighted in determining the risk of the object (e.g., reduce a value of trustworthiness associated with the object).

Figure 13:
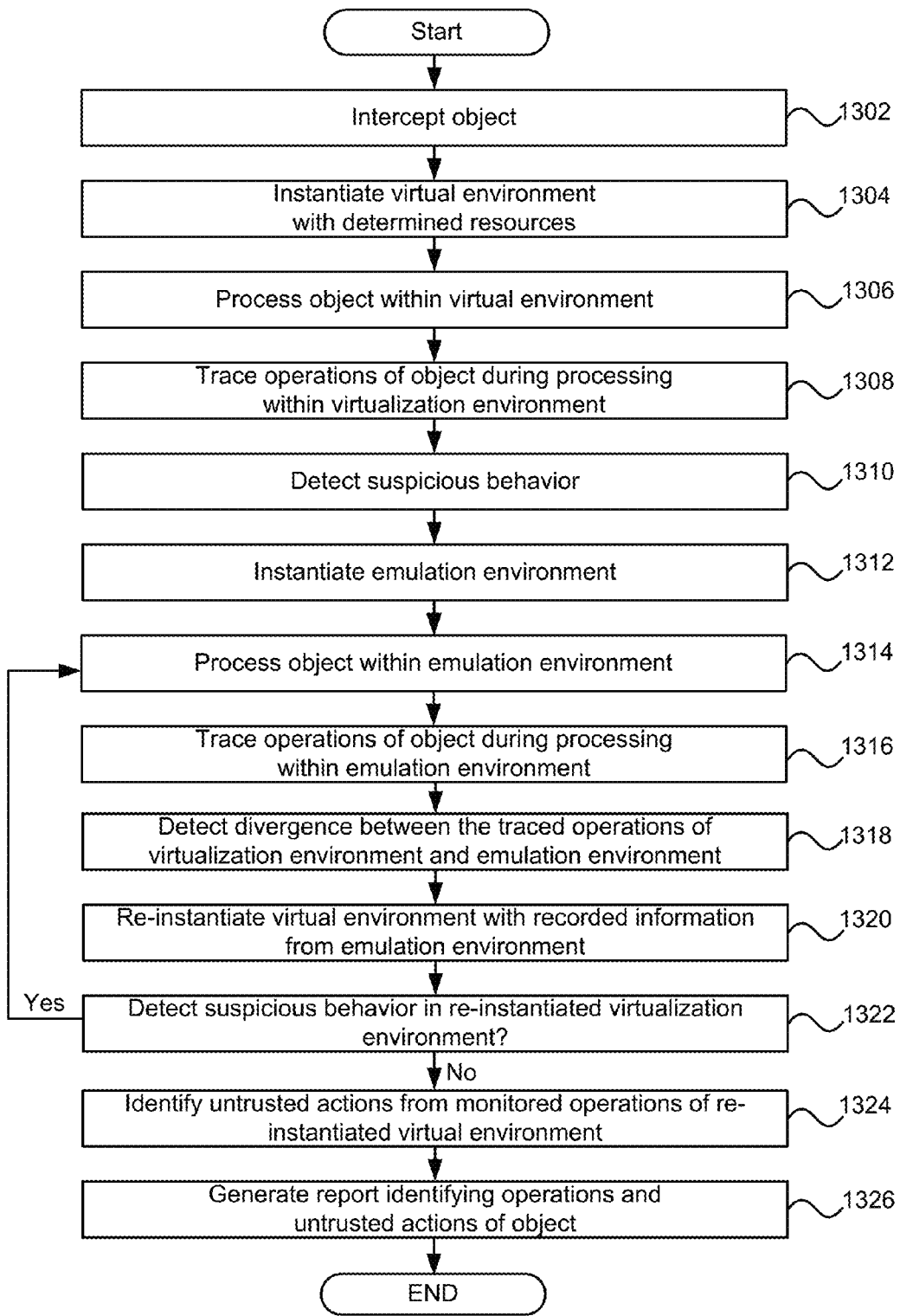
FIG. 13 is a flow diagram of an exemplary malware detection method utilizing an emulation environment in some embodiments.

FIG. 13 is a flow diagram of an exemplary malware detection method utilizing an emulation environment in some embodiments. In step 1302, an object is intercepted by a data collector. In various embodiments, the data collector, an agent associated with the data collector, and/or a security server 108 may test the object to determine if the object is suspicious. For example, the security server 108 may compare a hash of the object to a whitelist, compare a hash of the object to a blacklist, apply heuristic analysis, or apply statistical analysis. The security server 108 may also apply one or more rules to determine if the object is suspicious. For example, the security server 108 may have rules that flag an object as suspicious if the object came from an untrusted source, was being sent to an critical destination (e.g., the digital device that is to receive the object contains credit card numbers, health records, trade secret information, or other sensitive information), or was otherwise sent in an atypical manner (e.g., the sending digital device does not normally send objects to the destination digital device).

In step 1304, the virtual machine module 502 instantiates a first instance of a virtualization environment with the resources identified by the resource module 504. In one example, the virtual machine module 502 sets up plug-ins within the virtualization environment. In some embodiments, the resource module 504 inspects what resources the object needs (e.g., dynamic libraries and/or registries the object may affect). In step 1306, the object is executed and/or processed within the virtualization environment. In various embodiments, the taint module 508 taints operations of the object within the virtualization environment. In some embodiments, the taint module 508 taints the object, bit by bit, with trace capture information.

In step 1308, the virtual machine module 502 traces operations of the object during processing within the virtualization environment. In various embodiments, operations of, for, or provided as a response to the object may be used to generate one or more traces associated with the object in the virtualization environment. Similar to operations of the emulation environment trace capture module 1206, in some embodiments, the virtual machine module 502 may generate one or more traces based on actions of the plug-ins (e.g., the X trace) and actions taken that correlate between the virtualization environment and the plug-ins (e.g., the Y trace). In various embodiments, the actions identified for the trace generated by the virtual machine module 502 may also be filtered in a manner as described regarding filtering actions associated with the emulation environment.

In step 1310, the virtualization module 306 detects suspicious behavior of the object. For example, an object may be flagged as having suspicious behavior if the object executes a number of tasks and then abruptly terminates, executes one or more tasks that appear to have no relevant effect, checks a location in memory which should be empty, scans memory locations for no apparent purpose, hashes communication between the object and the host (e.g., to compare with a predetermined hash to identify a pattern of communication that is consistent with virtualization or security program interference), or the like.

In step 1312, the emulation module 308 instantiates an emulation environment. In various embodiments, the control module 310 determines when behavior of the object is suspicious and controls the instantiation of the emulation environment. One or more actions for or by the object within the virtualization environment may be used to determine a trustworthiness value. In one example, actions taken by or for an object may be weighted based on a matrix of actions regarding an operation system, application, network environment, or object. A trustworthiness value associated with one or more actions may be compared to a trustworthiness threshold to determine if the effect of the object within the virtualization environment is sufficiently trustworthy or if the object is behaving sufficiently suspicious to warrant running the object through the emulation environment. A user (e.g., administrator or security personnel) may set the threshold depending on the acceptable level of risk, available digital device resources (e.g., processors, speed of storage, available memory), and/or optimization.

In step 1312, the emulation module 308 instantiates the emulation environment. In various embodiments, the plug-in module 1204 instantiates the emulation environment with a standard set of plug-ins and/or other resources. In some embodiments, the plug-in module 1204 receives resource information from the resource module 504, the object, and/or metadata associated with the object. The plug-in module 1204 may configure the emulation environment (e.g., include one or more resources within the emulation environment) based, at least in part, on the resource information.

In step 1314, the emulation module 308 processes the object within the emulation environment. In step 1316, the trace capture module 1206 traces operations for or by the object during processing within the emulation environment. As discussed herein, the trace of the object within the emulation environment may be based on actions of the plug-ins and/or actions that correlate between the host, plug-ins and/or object. Those skilled in the art will appreciate that the trace of the object within the emulation environment and the trace of the object within the virtualization environment may be performed in any way. In some embodiments, the trace is generated differently (e.g., based on different action and/or different filtering) between the emulation environment and the virtualization environment.

In various embodiments, the recording module 1208 of the emulation module 308 may record information within the emulation environment. The recording module 1208 may record any operation, resource, or operation of the emulation environment. In various embodiments, the recording module 1208 records responses provided from the plug-ins, the host, and/or the hardware to the object.

In step 1318, the manager module 1210 may compare one or more traces of the virtualization environment to one or more traces of the emulation environment to detect divergence. In one example, the object may scan memory within the virtualization environment and identify file and/or remnants of running the virtualization. As a result, the object may "go benign" and not perform any malicious behavior in the virtualization environment. A copy of the object within the emulation environment may scan the memory and not find any files or remnants of a virtualization and, as a result, execute a malicious payload. The manager module 1210 may identify divergence between the two environments.

In various embodiments, when divergence is detected, the virtualization environment is re-instantiated or a new virtualization environment is instantiated at the point of divergence. For example, the time of divergence may be identified and the logged state of the emulation environment at that time of divergence may be provisioned within the virtualization environment. As a result, the virtualization module 306 may store similar data in memory at memory locations that are similar to the data stored in memory of the emulation environment at the time of divergence. Similarly, the clock signal within the virtualization environment may be accelerated such that the relevant conditions at the point of divergence may be similar between the two environments. The object within the virtualization environment may be presented with the recorded response from the emulation environment, and the operations of the object may continue to be monitored in the virtualization environment.

In step 1320, the virtualization module 306 re-instantiates the virtualization environment with recorded information from the emulation environment. In various embodiments, the virtualization module 306 re-instantiates the virtualization environment by halting processing within the virtualization environment and restarting the virtualization environment. In some embodiments, the virtualization module 306 re-instantiates the virtualization environment by instantiating a new virtualization environment.

The newly instantiated virtualization environment may be loaded with one or more states and information from the emulation environment. In one example, the emulation module 308 provides a page table (or information which may populate a page table) reflecting state and/or information that reflect operations within the environment. The virtualization module 306 may instantiate the virtualization environment with all or some of the page table information.

The virtualization module 306 may also provide all or some of the recorded information from the emulation environment to the object in the newly instantiated virtualization environment. For example, the virtualization module 306 may construct the newly instantiated virtualization environment to include all resources, data, memory, clock signals, and activities up to the point of divergence such that it may appear to the object that the object has been processed from the beginning and the object has received information (e.g., the recorded information) needed to proceed to a next step. In some embodiments, the recorded information and state of the newly instantiated virtualization environment allows the object to continue functioning (e.g., the object executes a malicious payload or the object continues examination looking for security programs or virtualization before executing the payload).

In step 1322, the virtualization module 306 continues to monitor the operations by and for the object to identify suspicious behavior in the re-instantiated virtualization environment. Similar, to step 1310, the virtualization module 306 may detect suspicious behavior in any number of ways. If the object continues to behave suspiciously, the control module 310 may instantiate a new emulation environment and may optionally load resources or plug-ins based on information from the resource module 504. Alternatively, the emulation module 308 may continue monitoring with the existing emulation environment. In some embodiments, the object continues processing in the emulation environment regardless if the object behaves suspiciously in the newly re-instantiated virtualization environment.

In step 1324, the virtualization module 306 monitors the operations by and for the object to identify untrusted actions in the re-instantiated virtualization environment. In various embodiments, one or more actions of or by the object may be characterized as untrusted based on a trustworthiness value. The trustworthiness value may be compared to a trustworthiness threshold to determine if actions taken by or for the object are untrustworthy (e.g., the object is considered to be malware). In one example, actions taken by or for an object may be weighted based on a matrix of actions regarding an operation system, application, network environment, or object. In some embodiments, a user (e.g., administrator or security personnel) may set the threshold depending on the acceptable level of risk.

In step 1326, the reporting module 312 generates a report describing the object and untrusted actions as described herein. The report may be similar to the report generated regarding step 716 in FIG. 7.

Figure 14:
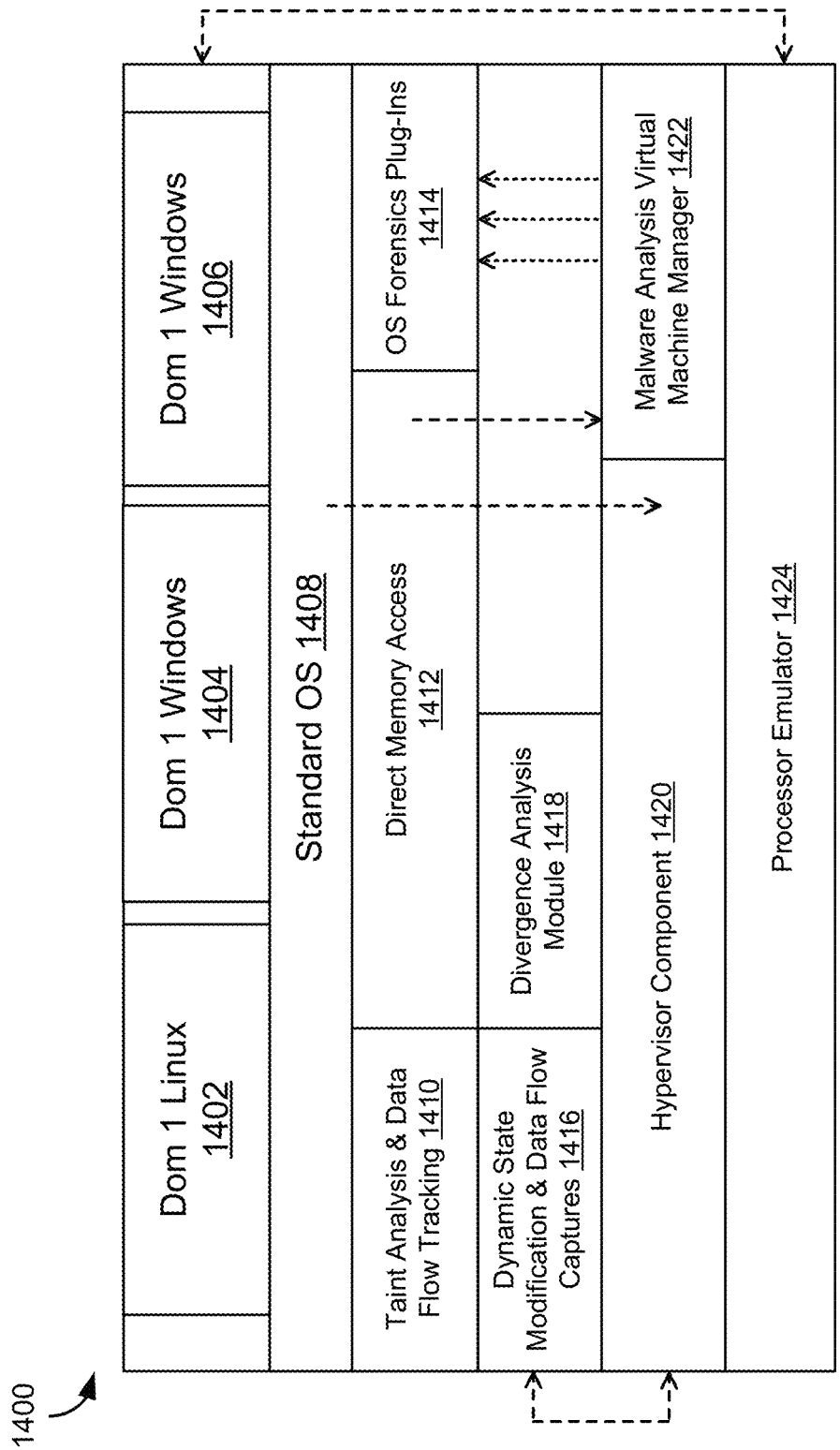
FIG. 14 is an exemplary emulation environment for detection of malware in some embodiments.

FIG. 14 is an exemplary emulation environment 1400 for detection of malware in some embodiments. The emulation environment 1400 may comprise a first domain 1402 running the LINUX® operating system, as well as first domains 1404 and 1406 running the WINDOWS® operating system. Further, the emulation environment 1400 may comprise a standard OS 1408, a taint analysis & data flow tracking 1410, direct memory access 1412, OS forensics plug-ins 1414, dynamic state modification & data flow captures 1416, divergence analysis module 1418, hypervisor component 1420, malware analysis virtual machine manager 1422, and a processor emulator 1424.

The domains 1402-1406 are the domains of the emulation environment 1400. In one example, the native domain may be domain 1402 running the LINUX® operating system, while domains 1404 and 1406 emulate the WINDOWS® operating system. Any domain may be native and any domain may be emulated.

The standard OS 1408 may be any OS (e.g., the LINUX® operating system) which may pass information to the other components of the emulation environment 1400. The standard OS 1408 may be any operating system.

The taint analysis and data flow tracking function 1410 may monitor and perform taint analysis to determine indications of maliciousness. In some embodiments, the taint analysis and data flow tracking function 1410 may receive information regarding tracking functions and tainting from a plug-in (e.g., from the OS forensics plug-ins function 1414).

The dynamic state modification & data flow captures 1416 may determine what resources are needed by an object in the emulation environment 1400. The dynamic state modification & data flow captures 1416 may identify additional resources required by the object, increase or decrease time value within the emulation environment 1400, and/or monitor behavior of the object. For example, the object may request resources that were not originally provisioned by the hypervisor component 1420. The hypervisor component 1420 may provision a new emulation environment 1400, adjust the emulation environment 1400 with the new resources, and/or synchronize requested resources with one or more other virtualization environment(s) and/or emulation environment(s).

Figure 15:
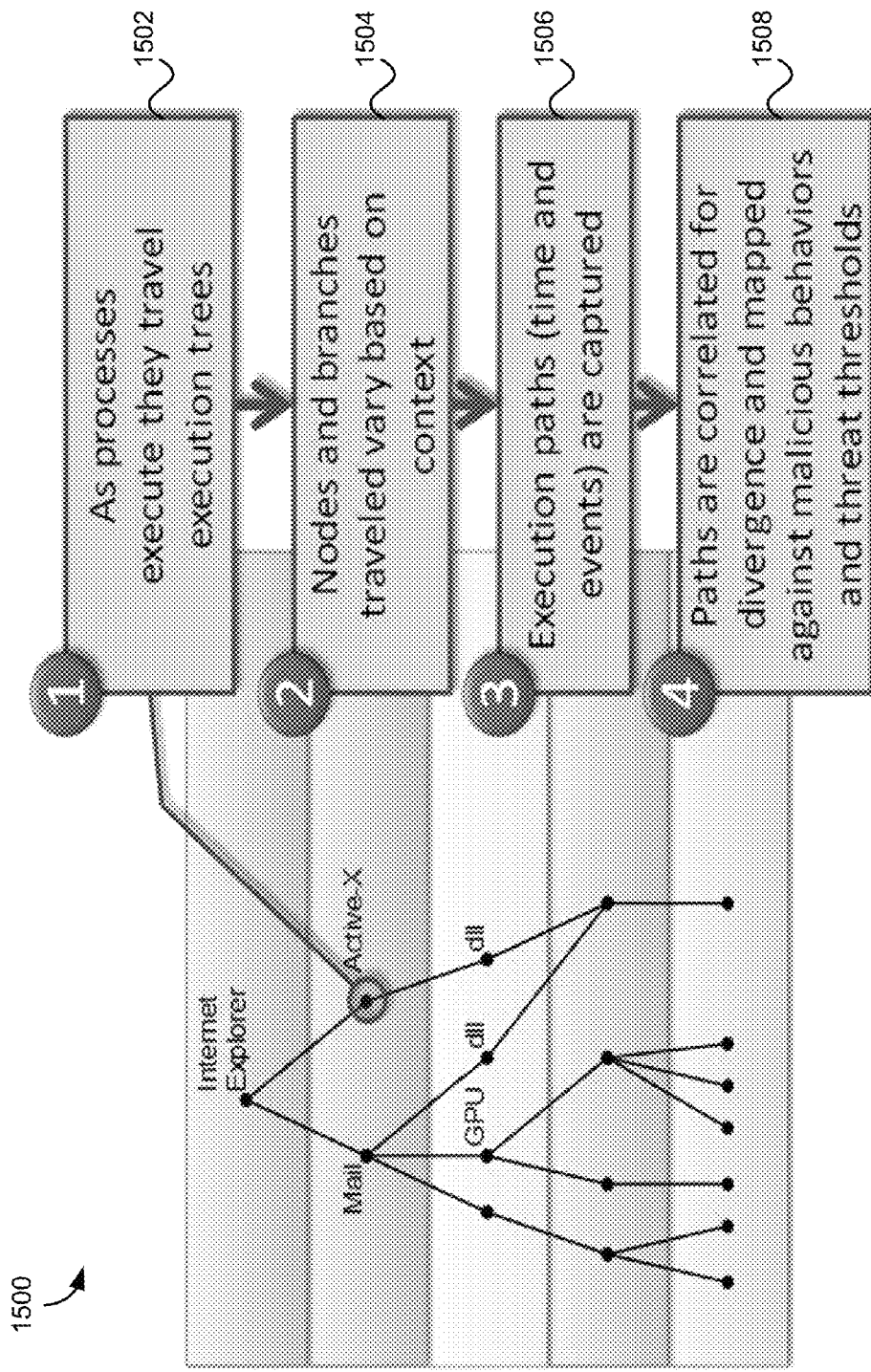
FIG. 15 is a trace diagram of operations by or for an object in an emulation environment in some embodiments.
Figure 16:
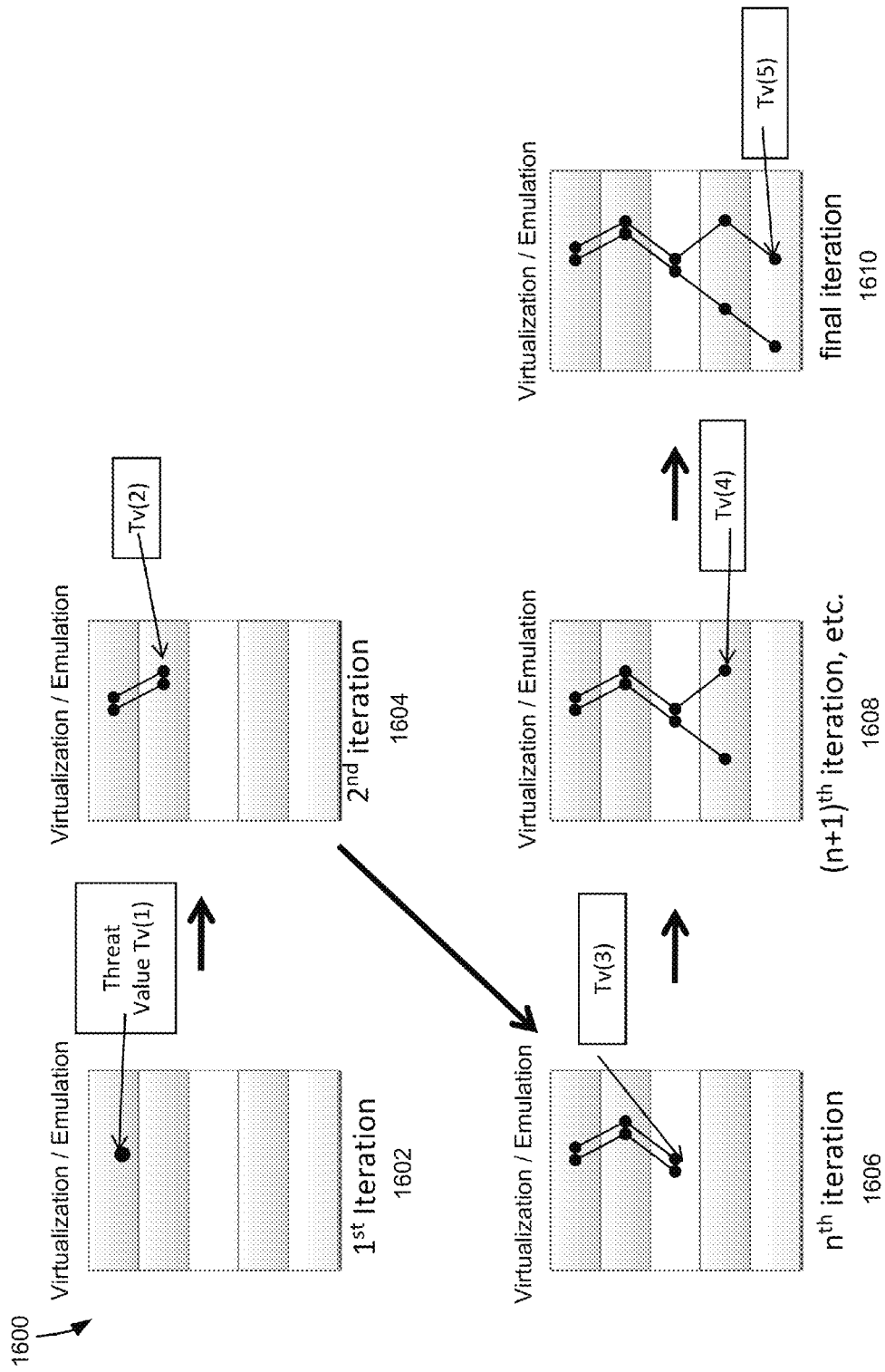
FIG. 16 is a block diagram of divergence detection between a virtualization environment and an emulation environment in some embodiments.

The divergence analysis module 1418 may track and compare operations of an object to determine divergence as discussed herein. In various embodiments, the divergence analysis module 1418 may trace operations as depicted in FIGS. 15 and 16 herein.

The hypervisor component 1420 may be configured to synchronize between multiple virtualization environment(s) and emulation environment(s). For example, the hypervisor component 1420 may control initial provisioning within the emulation environment based on resources requested in the virtualization environment, resources originally provisioned within the virtualization environment, resources requested in another emulation environment, or metadata associated with the object to be tested. The hypervisor component 1420 may also provide resources to be provisioned to one or more virtualization environment(s) and compare the operations between or among any number of environments (both virtualization environments and emulation environments).

The malware analysis virtual machine manager 1422 may receive information from the direct memory access 1412 and control the OS forensics plug-ins 1414. The OS forensics plug-ins 1414 may provide information to the dynamic state modification & data flow captures function 1416, the divergence analysis module 1418, and/or the hypervisor component 1420. In various embodiments, the malware analysis virtual machine manager 1422 may also select, initiate, control, and/or deactivate plug-ins.

The processor emulator 1424 is any processor and/or emulator to assist in the emulation process. In one example, the processor emulator 1424 may implement generic machine emulator and virtualizer.

FIG. 15 is a trace diagram 1500 of operations by or for an object in an emulation environment in some embodiments. In various embodiments, the trace capture module 1206 generates a trace of the behavior of the object in the emulation environment. The trace of the object in the emulation environment may be compared to a trace of the object in the virtualization environment to detect divergence. Those skilled in the art will appreciate that the trace of the object in the virtualization environment may be generated based on different factors or in a different way than the trace generated for the object in the emulation environment.

In step 1502, as processes for the object execute, actions taken for or by the object in the emulation environment may travel execution trees. For example, the object may be a file that is executed within the INTERNET EXPLORER® browser. The object may spawn a mail process and an Active X process. In step 1504, nodes and branches generated on the execution tree may vary based on context.

In step 1506, the trace capture module 1206 captures execution paths of the execution trees. For example, the trace capture module 1206 may capture time and events (e.g., operations by or for the object) to determine an execution path. In some embodiments, the execution path may represent functions of the plug-ins of the emulation environment.

In step 1508, the control module 310 may correlate the execution paths of the execution trees between the emulation environment and the virtualization environment for divergence. Further, the execution paths of the execution trees of the virtualization environment and the emulation environment may be mapped against malicious behaviors and threat thresholds to determine the degree of untrustworthiness. For example, one or more operations of or by the object in the virtualization environment and/or the emulation environment may be measured against a predetermined threshold (e.g., based on a frame of reference identifying a degree of risk along different dimensions such as object operations, application operations, operating system operations, and network operations).

Those skilled in the art will appreciate that the threshold and trustworthiness valuation procedure may be customized. Certain risks, depending on the nature of the network, the state of critical information (e.g., encrypted), and the like may influence how an administrator may characterize the threshold and valuation procedure.

FIG. 16 is a block diagram 1600 of divergence detection between a virtualization environment and an emulation environment in some embodiments. Traces may be discrete based on events (e.g., operations) and/or time. Those skilled in the art will appreciate that in the various execution trees depicted in FIG. 16, the execution tree on the left side of the graphs represents an execution tree in the virtualization environment while the execution tree on the right of the graphs represents an execution tree in the emulation environment. Although the term "iteration" is used within FIG. 16, the different graphs 1602-1610 may be understood to be based on time, events, or paths.

In graph 1602, the instantiation of the execution tree at time 0 depicts an initial operation. The initial operation of the execution tree may be an instantiation of an application (e.g., INTERNET EXPLORER® browser v. 5.0) or resource call by or for the object.

The spot in graph 1602 is identified with a threat value to indicate whether the operation is trustworthy or untrustworthy. As discussed herein, one or more executions of the execution tree may be measured (e.g., characterized as a threat level) to determine a degree of threat or maliciousness (e.g., a trustworthiness value). The measure (i.e., threat or trustworthiness value) may be compared against a threat or trustworthiness threshold to determine whether the action represents an untrusted action (e.g., malicious behavior). In some embodiments, all executions, paths, and nodes of the execution path may be measured to determine the degree of threat or maliciousness. Those skilled in the art will appreciate that each individual step (e.g., the deltas between the graphs) may be measured to determine a degree of threat of each step. Further, the entire execution tree at various points in time may also be measured to determine a degree of threat of the steps in combination.

In graph 1604, the first path (e.g., at time T+1 where time T begins at the $1^{st}$ Iteration 1602) indicates that the execution path of the object within the virtualization environment and the execution path of the object within the emulation environment are similar. In one example, the object may load or make a call to Active X. In graph 1606, the second path (e.g., at time T+2) at the nth iteration indicates that the next execution path of the object within the virtualization environment and the execution path of the object within the emulation environment remain similar.

In graph 1608, the third path (e.g., at time T+3), indicates that there is a divergence of the execution path of the object in the virtualization environment when compared to the execution path of the object in the emulation environment. In one example, the object in the virtualization environment may have detected virtualization, a missing resource, or evidence of a security application and started behaving in a different manner. Once the divergence is detected, the control module 310 may re-instantiate the virtualization environment. In some embodiments, the control module 310 may load the state of the previous virtualization environment or the state of the emulation environment in the newly re-instantiated virtualization environment. In some embodiments, the state may include information of the virtualization environment and/or the emulation environment immediately before or at the time of divergence.

In some embodiments, the original virtualization environment and the emulation environment may continue without termination to further assess the execution path of the object in both environments. In one example, even though the path originally diverged, the object may continue to operate in a similar manner or to perform slightly different actions.

Those skilled in the art will appreciate that although graph 1610 is identified as "final," there may be any number of paths over time before termination of the execution path (e.g., either by the object, the virtualization module 306, emulation module 308, or the control module 310).

Further, those skilled in the art will appreciate that the control module 310 may determine divergence of the execution trees between the object in the virtualization environment and the emulation environment as the steps in one or the other environments occur or once processing within one or both environments terminates.

The emulation module 308 may begin processing the object at any point in time. For example, the virtualization module 306 may track when suspicious behavior occurred. The emulation module 308 may be configured to provision the emulation environment with at least some of the resources of the virtualization module 306 including the states of the virtualization environment at the time of suspicious behavior. The emulation module 308 may then begin processing the object immediately before or at the time of suspicious behavior.

Figure 17:
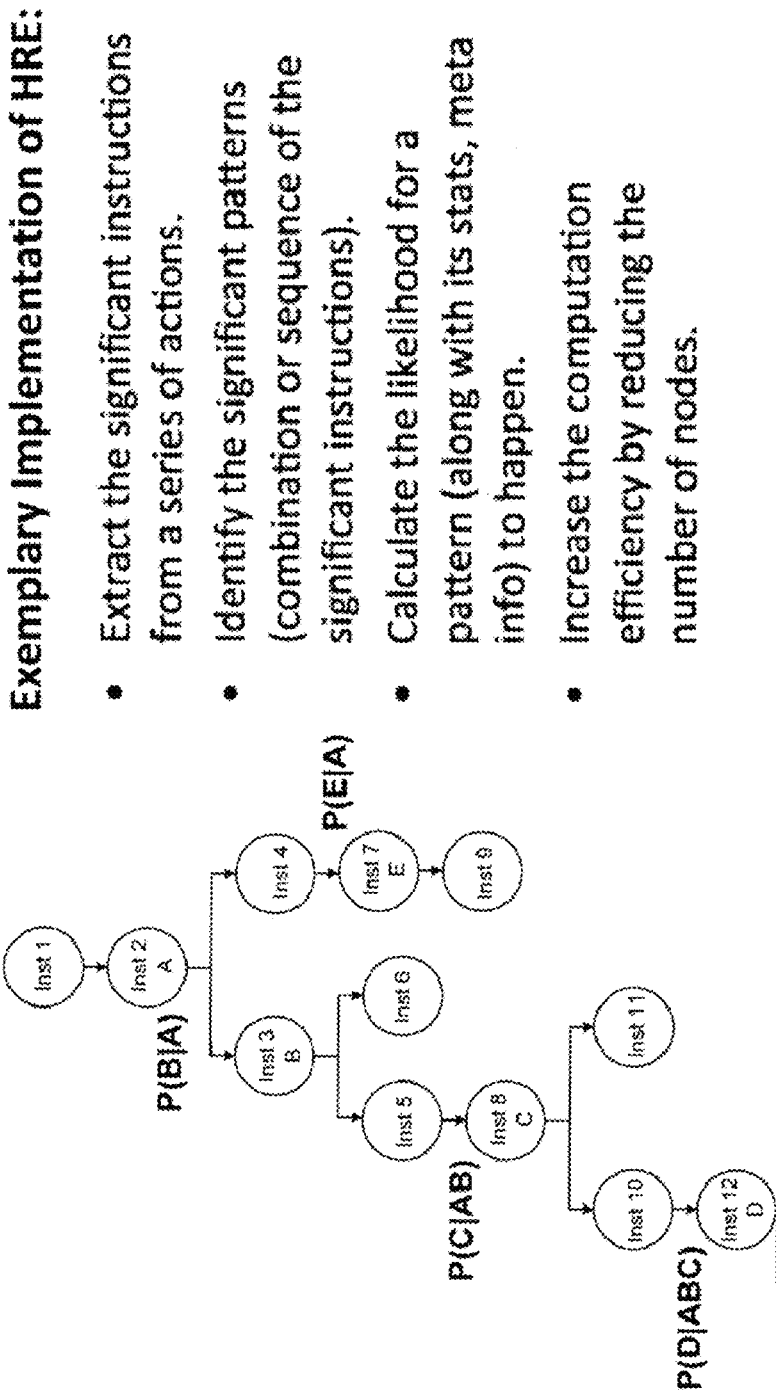
FIG. 17 is an exemplary process for a hierarchical reasoning engine (HRE) in some embodiments.

FIG. 17 is an exemplary process 1700 for a hierarchical reasoning engine (HRE) in some embodiments. In various embodiments, the HRE extracts significant instructions from a series of actions of an object under assessment. In one example, the HRE identifies sets of actions (e.g., resource requests and/or operations) that may be associated with malicious activities. The set of actions may be in any order or may, in part, depend upon the order of instructions.

The HRE may identify significant patterns based upon the set of instructions. For example, the HRE may compare sets or subsets of instructions against a table or other data structure that contains sets or subsets of instructions that indicate maliciousness. In some embodiments, the HRE may compare sets or subsets of instructions against a table or other data structure that contains sets or subsets of instructions that indicate trustworthiness.

Those skilled in the art will appreciate that the HRE may calculate a likelihood for a pattern indicative of trust or maliciousness may occur. In various embodiments, the HRE may take many different types of information (e.g., statistics, heuristics, metadata, and the like) into account to determine a likelihood. In various embodiments, the HRE may determine a value or bias a threat value based on the likelihood that the set of actions is malicious.

For example, the HRE may monitor operations of an object within an emulation environment. The HRE may track the actions of the object and compare a set of the object's actions to known malicious sets of actions. If the object's actions match a set of actions that are known to be malicious, then the HRE may flag the object as malicious, and update a threat index to indicate an increased likelihood of maliciousness. In some embodiments, one or more emulation environment(s) and/or virtualization environment(s) (e.g., all or a subset of environments) may be terminated upon identification of a malicious sets of actions. In various embodiments, the objects may continue to be assessed in one or more virtualization environment(s) and/or emulation environment(s) for more information.

The HRE may provide another level of information that may identify likelihood of maliciousness and further provide better information regarding the object's risk or trustworthiness. As a result, a user may set a preference for an acceptable level of risk to accept or reject data based on the level of trustworthiness calculated by systems and methods described herein.

Those skilled in the art will appreciate that the computation efficiency may increase by reducing the number of nodes needed by tracking actions of objects and comparing those actions to known behaviors. Further, similarly behaving objects may be more readily observed and classified accordingly, thereby increasing overall efficiency and accuracy.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method comprising:
in response to a data collector on a first network determining that an object transmitted from a first digital device to a second digital device and intercepted by the data collector is suspicious, receiving at a second network the object from the data collector on the first network; and
at the second network:
instantiating a set of virtualization environments, each virtualization environment including a different set of one or more resources based on metadata received from the data collector;
processing the object within the set of virtualization environments;
tracing operations of the object while processing within each of the virtualization environments of the set of virtualization environments to generate a first set of traced operations;
detecting suspicious behavior associated with the object in at least one of the virtualization environments of the set of virtualization environments;
instantiating an emulation environment in response to the detected suspicious behavior in the at least one of the virtualization environments of the set of virtualization environments;
processing the object within the emulation environment;
recording responses to the object within the emulation environment to generate recorded responses;
tracing operations of the object while processing within the emulation environment to generate a second set of traced operations;
determining a likelihood of maliciousness based on at least one of the suspicious behavior associated with the object in the at least one of the virtualization environments, the recorded responses, the first set of traced operations, and the second set of traced operations; and
if the determined likelihood of maliciousness is greater than a threshold, generating a report regarding the object, the report including at least one of the recorded responses, the first set of traced operations, and the second set of traced operations.

2. The method of claim 1, wherein the suspicious behavior comprises the object loading data into memory within the at least one of the virtualization environments but not using the data within the at least one of the virtualization environments.

3. The method of claim 1, wherein the suspicious behavior comprises the object scanning locations in memory of the at least one of the virtualization environments and then terminating operations.

4. The method of claim 1, wherein the suspicious behavior comprises the object halting operations.

5. The method of claim 1, wherein trace capturing is performed in a kernel of a digital device hosting the emulation environment.

6. The method of claim 1, further comprising increasing or decreasing a frequency of a clock signal within the emulation environment.

7. The method of claim 1, further comprising re-instantiating the at least one of the virtualization environments in response to a detected divergence and instantiating a modified image of the at least one of the virtualization environments.

8. The method of claim 7, further comprising applying state information from the emulation environment to the at least one of the re-instantiated virtualization environments.

9. The method of claim 7, wherein re-instantiating the at least one of the virtualization environments in response to the detected divergence comprises halting the at least one of the virtualization environments and restarting the at least one of the virtualization environments.

10. The method of claim 7, wherein the at least one of the virtualization environments is re-instantiated at a state when the divergence is detected between the at least one of the virtualization environments and the emulation environment.

11. A system comprising:
memory;
one or more processors; and
one or more modules stored in the memory and configured for execution by the one or more processors, the modules comprising:
instructions to receive at a second network an object intercepted by a data collector on a first network in response to the data collector on the first network determining that an object transmitted from a first digital device to a second digital device is suspicious;
instructions to instantiate a set of virtualization environments, each virtualization environment including a different set of one or more resources based on metadata received from the data collector;
instructions to process the object within the set of virtualization environments;
instructions to trace operations of the object while processing within each of the virtualization environments of the set of virtualization environments to generate a first set of traced operations;
instructions to detect suspicious behavior associated with the object in at least one of the virtualization environments of the set of virtualization environments;
instructions to instantiate an emulation environment in response to the detected suspicious behavior in the at least one of the virtualization environments of the set of virtualization environments;
instructions to process the object within the emulation environment;
instructions to record responses to the object within the emulation environment to generate recorded responses;
instructions to trace operations of the object while processing within the emulation environment to generate a second set of traced operations;
instructions to determine a likelihood of maliciousness based on at least one of the suspicious behavior associated with the object in the at least one of the virtualization environments, the recorded responses, the first set of traced operations, and the second set of traced operations; and
instructions to generate a report regarding the object, if the determined likelihood of maliciousness is greater than a threshold, the report including at least one of the recorded responses, the first set of traced operations, and the second set of traced operations.

12. The system of claim 11, wherein the suspicious behavior comprises the object loading data into memory within the at least one of the virtualization environments but not using the data within the at least one of the virtualization environments.

13. The system of claim 11, wherein the suspicious behavior comprises the object scanning locations in memory of the at least one of the virtualization environments and then terminating operations.

14. The system of claim 11, wherein the suspicious behavior comprises the object halting operations.

15. The system of claim 11, wherein trace capturing is performed in a kernel of a digital device hosting the emulation environment.

16. The system of claim 11, wherein the modules further comprise instructions to increase or decrease a frequency of a clock signal within the emulation environment.

17. The system of claim 11, wherein the modules further comprise instructions to re-instantiate the at least one of the virtualization environments in response to a detected divergence and instructions to instantiate a modified image of the at least one of the virtualization environments in response to the detected divergence.

18. The system of claim 17, wherein the modules further comprise instructions to apply state information from the emulation environment to the at least one of the re-instantiated virtualization environments.

19. The system of claim 17, wherein the instructions to re-instantiate the at least one of the virtualization environments in response to the detected divergence comprise instructions to halt the at least one of the virtualization environments and restart the at least one of the virtualization environments.

20. The system of claim 17, wherein the modules further comprise instructions to re-instantiate the at least one of the virtualization environments at a state when the divergence is detected between the at least one of the virtualization environments and the emulation environment.

21. A non-transitory computer readable medium comprising instructions, the instructions being executable for performing a method, the method comprising:
in response to a data collector on a first network determining that an object transmitted from a first digital device to a second digital device and intercepted by the data collector is suspicious, receiving at a second network the object from the data collector on the first network;
instantiating a set of virtualization environments, each virtualization environment including a different set of one or more resources based on metadata received from the data collector;
processing the object within the set of virtualization environments;
tracing operations of the object while processing within each of the virtualization environments of the set of virtualization environments to generate a first set of traced operations;
detecting suspicious behavior associated with the object in at least one of the virtualization environments of the set of virtualization environments;
instantiating an emulation environment in response to the detected suspicious behavior in the at least one of the virtualization environments of the set of virtualization environments;
processing the object within the emulation environment;

recording responses to the object within the emulation environment to generate recorded responses;

tracing operations of the object while processing within the emulation environment to generate a second set of traced operations;

determining a likelihood of maliciousness based on at least one of the suspicious behavior associated with the object in the at least one of the virtualization environments, the recorded responses, the first set of traced operations, and the second set of traced operations; and if the determined likelihood of maliciousness is greater than a threshold, generating a report regarding the object, the report including at least one of the recorded responses, the first set of traced operations, and the second set of traced operations.

* * * * *